US011536209B2

(12) United States Patent
Sato et al.

(10) Patent No.: US 11,536,209 B2
(45) Date of Patent: Dec. 27, 2022

(54) CONTROL DEVICE, ENGINE, AND CONTROL METHOD OF ENGINE

(71) Applicant: MITSUBISHI HEAVY INDUSTRIES ENGINE & TURBOCHARGER, LTD., Sagamihara (JP)

(72) Inventors: Daisuke Sato, Sagamihara (JP); Tomohide Yamada, Sagamihara (JP); Ryuji Kita, Sagamihara (JP); Hiroki Nakano, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/274,260

(22) PCT Filed: Aug. 28, 2019

(86) PCT No.: PCT/JP2019/033682
§ 371 (c)(1),
(2) Date: Mar. 8, 2021

(87) PCT Pub. No.: WO2020/054417
PCT Pub. Date: Mar. 19, 2020

(65) Prior Publication Data
US 2021/0348572 A1 Nov. 11, 2021

(30) Foreign Application Priority Data

Sep. 10, 2018 (JP) .............................. JP2018-168477

(51) Int. Cl.
*F02D 41/00* (2006.01)
*F02D 41/02* (2006.01)
(Continued)

(52) U.S. Cl.
CPC ......... *F02D 41/0055* (2013.01); *F01N 3/021* (2013.01); *F01N 3/023* (2013.01);
(Continued)

(58) Field of Classification Search
CPC ............. F02D 41/0055; F02D 41/0072; F02D 41/0077; F02D 41/024; F02D 41/029;
(Continued)

(56) References Cited

U.S. PATENT DOCUMENTS 4,644,474 A 2/1987 Aposchanski et al.
2004/0159098 A1 8/2004 Gui et al.
(Continued)

FOREIGN PATENT DOCUMENTS

DE 10 2008 053 584 A1 4/2009
EP 1 837 491 A1 9/2007
(Continued)

OTHER PUBLICATIONS

International Preliminary Report on Patentability and Written Opinion of the International Searching Authority for International Application No. PCT/JP2019/033682, dated Mar. 25, 2021, with English translation.
(Continued)

*Primary Examiner* — Audrey B. Walter
(74) *Attorney, Agent, or Firm* — Birch, Stewart, Kolasch & Birch, LLP

(57) ABSTRACT

Provided is a control device configured to be able to execute, in an engine which includes a DOC, a DPF, and a temperature increase unit including an exhaust throttle valve, for increasing a temperature of each of the DOC and the DPF, a forced regeneration process of removing PM deposited on the DPF by increasing the temperature of the DPF. The control device includes a flow rate estimation part configured to estimate an intake flow rate of a combustion gas sent
(Continued)

into a cylinder of the engine. The flow rate estimation part is configured to estimate a first intake flow rate, which is the intake flow rate in the forced regeneration process, from an opening degree of the exhaust throttle valve and a first state amount which indicates an operation state of the engine including a rotation speed of the engine, based on a first relationship representing a relationship between the first intake flow rate, and the opening degree of the exhaust throttle valve and the first state amount, in the forced regeneration process.

12 Claims, 11 Drawing Sheets

(51) Int. Cl.

| | |
|---|---|
| *F02D 41/14* | (2006.01) |
| *F02M 26/48* | (2016.01) |
| *F01N 3/021* | (2006.01) |
| *F01N 3/02* | (2006.01) |
| *F01N 3/10* | (2006.01) |
| *F01N 3/023* | (2006.01) |
| *F02D 41/22* | (2006.01) |
| *F02D 41/18* | (2006.01) |

(52) U.S. Cl.
CPC .......... *F01N 3/0235* (2013.01); *F01N 3/103* (2013.01); *F02D 41/0072* (2013.01); *F02D 41/0077* (2013.01); *F02D 41/024* (2013.01); *F02D 41/029* (2013.01); *F02D 41/1445* (2013.01); *F02M 26/48* (2016.02); *F02D 41/18* (2013.01); *F02D 41/222* (2013.01); *F02D 2200/0614* (2013.01); *F02D 2200/0812* (2013.01); *F02D 2200/101* (2013.01); *F02D 2200/703* (2013.01); *F02D 2700/04* (2013.01)

(58) Field of Classification Search
CPC .... F02D 41/1445; F02D 41/18; F02D 41/222; F02D 2200/0614; F02D 2200/0812; F02D 2200/101; F02D 2200/703; F02D 2700/04; F01N 3/021; F01N 3/023; F01N 3/0235; F01N 3/103; F02M 26/48
See application file for complete search history.

(56) References Cited

U.S. PATENT DOCUMENTS

| | | |
|---|---|---|
| 2004/0206074 A1 | 10/2004 | Akao et al. |
| 2006/0201144 A1 | 9/2006 | Gabe et al. |
| 2008/0209887 A1 | 9/2008 | Hanari et al. |
| 2009/0107131 A1 | 4/2009 | Takeuchi et al. |
| 2017/0051684 A1 | 2/2017 | Lahti et al. |

FOREIGN PATENT DOCUMENTS

| | | | | |
|---|---|---|---|---|
| JP | 55-142942 A | | 11/1980 | |
| JP | 6-213060 A | | 8/1994 | |
| JP | 2901-152933 A | | 6/2001 | |
| JP | 2001303980 A | * | 10/2001 | .......... F02D 41/029 |
| JP | 2003-206724 A | | 7/2003 | |
| JP | 2004-100516 A | | 4/2004 | |
| JP | 2004-353529 A | | 12/2004 | |
| JP | 2007-321705 A | | 12/2007 | |
| JP | 2008-215168 A | | 9/2008 | |
| JP | 2010-270658 A | | 12/2010 | |
| JP | 2011-58379 A | | 3/2011 | |

OTHER PUBLICATIONS

International Search Report for international Application No. PCT/JP2019/033682, dated Nov. 5, 2019.
Extended European Search Report for European Application No. 19858827.9, dated Sep. 27, 2021.

* cited by examiner

CONTROL DEVICE, ENGINE, AND CONTROL METHOD OF ENGINE

TECHNICAL FIELD

The present disclosure relates to a control device, an engine including the control device, and a control method of the engine for executing, in the engine including a DOC and a DPF in an exhaust passage, a forced regeneration process of removing PM deposited on the DPF by increasing a temperature of the DPF by a temperature increase unit.

BACKGROUND

An engine (diesel engine) may be equipped with an exhaust gas purification device which includes a diesel oxidation catalyst (DOC) disposed in an exhaust passage of the engine and a diesel particulate filter (DPF) disposed downstream of the DOC in the exhaust passage to collect particulate matters (PM), such as soot, contained in an exhaust gas (see Patent Document 1, 2).

If the PM collected by the DPF is deposited and clogs the DPF, PM-collecting performance may be declined, or an exhaust pressure may be increased, deteriorating fuel efficiency. Thus, the forced regeneration process of removing the PM deposited on the DPF is executed every time a PM deposition amount reaches a predetermined amount, or an engine operation time elapses a certain period of time.

The forced regeneration process (automatic regeneration process) for the DPF is executed by forcibly increasing an inlet temperature of the DPF. In general, the inlet temperature of the DPF is forcibly increased by supplying a non-combusted fuel to an exhaust gas treatment device by late-post injection, which is to inject a fuel after a main-combustion injection timing, and oxidizing the non-combusted fuel with the diesel oxidization catalyst (DOC) to generate heat, after the inlet temperature of the DOC is increased to a predetermined temperature (about 250° C.) at which the DOC is active.

In order to increase the inlet temperature of the DOC to the above-described predetermined temperature, the opening degree of an intake throttle valve disposed in an intake passage of the engine and an exhaust throttle valve disposed in the exhaust passage of the engine may be reduced, and an injection amount and an injection timing of the non-combusted fuel in early-post injection executed after the main-combustion injection timing and before the late-post injection timing may be adjusted.

In order to execute the forced regeneration process for the DPF described above, it is necessary to grasp the intake flow rate of a combustion gas before combustion sent into a cylinder of the engine. Conventionally, the accurate intake flow rate is estimated by actually measuring the flow rate in the intake passage by an air flow meter disposed in the intake passage.

CITATION LIST

Patent Literature

Patent Document 1: JP2003-206724A
Patent Document 2: JP2004-353529A
Patent Document 3: JPS55-142942A

SUMMARY

Technical Problem

In case of a failure of an air flow meter, it is impossible to estimate an accurate intake flow rate. Thus, not only a forced regeneration process for a DPF but also control of an engine may not appropriately be performed. Meanwhile, since the air flow meter is expensive, a problem arises in that a reduction in cost of an engine equipped with the air flow meter is hampered. Thus, it is desirable to obtain the accurate intake flow rate without using the air flow meter, regardless of whether the engine is equipped with the air flow meter.

Patent Document 3 discloses that in an engine which includes an intake throttle valve disposed in an intake passage, an intake flow rate changes in accurate correspondence with a rotation speed of the engine (engine rotation speed), and thus the intake flow rate is obtained from the rotation speed of the engine to control a fuel injection valve in accordance with the obtained intake flow rate.

However, the present inventors have found that in an engine which includes an exhaust throttle valve disposed in an exhaust passage, the opening degree of the exhaust throttle valve is reduced in a forced regeneration process, decreasing volumetric efficiency, and thus it is difficult to estimate, from the rotation speed of the engine (an operation state of the engine), the intake flow rate of the combustion gas sent into a cylinder of the engine in the forced regeneration process, as in Patent Document 3.

In view of the above issues, an object of at least one embodiment of the present invention is to provide a control device capable of accurately estimating the intake flow rate of the combustion gas before combustion sent into the cylinder, without using the air flow sensor.

Solution to Problem (1) A control device according to at least one embodiment of the present invention is a control device configured to be able to execute, in an engine which includes a DOC disposed in an exhaust passage of the above-described engine, a DPF disposed downstream of the above-described DOC in the above-described exhaust passage, and a temperature increase unit for increasing a temperature of each of the above-described DOC and the above-described DPF, a forced regeneration process of removing PM deposited on the above-described DPF by increasing the temperature of the above-described DPF. The above-described temperature increase unit includes an exhaust throttle valve disposed in the above-described exhaust passage. The above-described control device includes a flow rate estimation part configured to estimate an intake flow rate of a combustion gas sent into a cylinder of the above-described engine. The above-described flow rate estimation part is configured to estimate a first intake flow rate, which is the above-described intake flow rate in the above-described forced regeneration process, from an opening degree of the above-described exhaust throttle valve and a first state amount which indicates an operation state of the above-described engine including a rotation speed of the above-described engine, based on a first relationship representing a relationship between the above-described first intake flow rate, and the opening degree of the above-described exhaust throttle valve and the above-described first state amount, in the above-described forced regeneration process.

The present inventors have found that since the exhaust throttle valve is fully opened or nearly fully opened in the normal operation, it is possible to estimate, based on the operation state of the engine, the second intake flow rate which is the intake flow rate of the combustion gas sent into the cylinder of the engine in the normal operation; however, since the opening degree of the exhaust throttle valve is reduced, resulting in an increase in back pressure (the pressure of the exhaust passage) and a decrease in volumetric efficiency in the forced regeneration process, it is difficult to estimate, based on only the operation state of the engine, the first intake flow rate which is the intake flow rate of the combustion gas sent into the cylinder of the engine in the forced regeneration process.

Moreover, as a result of intensive researches, the present inventors have found that it is possible to accurately estimate the above-described first intake flow rate from the first opening degree, which is the opening degree of the exhaust throttle valve in the forced regeneration process, and the first state amount, which indicates the operation state of the engine including the rotation speed of the engine in the forced regeneration process.

With the above configuration (1), it is possible to accurately estimate the corresponding first intake flow rate from the first state amount and the first opening degree based on the first relationship, that is, the relationship between the above-described first intake flow rate, and the above-described first opening degree and the above-described first state amount. In the forced regeneration process, the control device performs control of reducing (decreasing) the opening degree of the exhaust throttle valve. Using the first opening degree, that is, the opening degree of the exhaust throttle valve in the forced regeneration process to estimate the first intake flow rate, it is possible to estimate the first intake flow rate considering the decrease in volumetric efficiency which is caused by reducing the opening degree of the exhaust throttle valve. Thus, with the above configuration, it is possible to accurately estimate the intake flow rate of the combustion gas sent into the cylinder of the engine, without using an air flow sensor.

(2) In some embodiments, in the control device according to the above configuration (1), the above-described flow rate estimation part is configured to estimate a second intake flow rate, which is the above-described intake flow rate in a normal operation where the above-described forced regeneration process is not executed, from a second state amount which indicates an operation state of the above-described engine including the rotation speed of the above-described engine and a fuel injection amount, based on a second relationship representing a relationship between the above-described second state amount and the above-described second intake flow rate, in the above-described normal operation.

As described above, since the exhaust throttle valve is fully opened or nearly fully opened in the normal operation, it is possible to estimate the second intake flow rate which is the intake flow rate in the normal operation based on the operation state of the engine.

With the above configuration (2), it is possible to accurately estimate, based on the second relationship, that is, the relationship between the second state amount which indicates the operation state of the engine including the rotation speed of the engine and the fuel injection amount in the normal operation, and the second intake flow rate which is the intake flow rate of the combustion gas sent into the cylinder in the engine in the normal operation, the corresponding second intake flow rate from the second state amount. Thus, with the above configuration, it is possible to accurately estimate the intake flow rate of the combustion gas sent into the cylinder of the engine in the normal operation, without using the air flow sensor.

(3) In some embodiments, in the control device according to the above configuration (2), the above-described engine further includes an EGR passage for connecting an intake passage and the above-described exhaust passage of the above-described engine, and for returning a part of an exhaust gas, which is discharged from the above-described engine, to the above-described intake passage as an EGR gas, and an EGR valve configured to be able to adjust a flow rate of the above-described EGR gas flowing through the above-described EGR passage, and the above-described flow rate estimation part is configured to estimate the flow rate of the above-described EGR gas from the above-described second state amount and an opening degree of the above-described EGR valve, based on a third relationship representing a relationship between the flow rate of the above-described EGR gas flowing through the above-described EGR passage, and the above-described second state amount and the opening degree of the above-described EGR valve.

With the above configuration (3), it is possible to accurately estimate the flow rate of the EGR gas flowing through the EGR passage from the second state amount and the opening degree of the EGR valve based on the third relationship, that is, the relationship between the flow rate of the EGR gas flowing through the EGR passage, and the second state amount and the opening degree of the EGR valve described above. Thus, the control device can perform control in consideration of the flow rate of the EGR gas flowing through the EGR passage.

(4) In some embodiments, the control device according to the above configuration (2) or (3) further includes a PM deposition amount estimation part configured to be able to estimate a deposition amount of the above-described PM deposited on the above-described DPF, and a first intake flow rate correction part configured to decrease the above-described first intake flow rate, which is estimated by the above-described flow rate estimation part, in accordance with a first correction value, which is a correction value of the above-described first intake flow rate and is estimated from the above-described PM deposition amount estimated by the above-described PM deposition amount estimation part, based on a fourth relationship representing a relationship between the above-described first correction value and above-described the PM deposition amount estimated by the above-described PM deposition amount estimation part.

With the above configuration (4), the first intake flow rate correction part is configured to decrease the first intake flow rate estimated by the flow rate estimation part, in accordance with the first correction value which is estimated from the PM deposition amount estimated by the PM deposition amount estimation part. If the PM deposition amount on the DPF increases, the back pressure of the engine is increased and exhaust efficiency is decreased, inevitably decreasing intake efficiency and volumetric efficiency. The corrected first intake flow rate, which is obtained by decreasing the first intake flow rate estimated by the flow rate estimation part in accordance with the first correction value, is increased in accuracy by reflecting the decrease in volumetric efficiency caused by the PM deposition amount on the DPF thereon. Thus, with the above configuration, it is possible to improve estimation accuracy of the first intake flow rate.

(5) In some embodiments, the control device according to the above configuration (2) or (3) further includes a PM deposition amount estimation part configured to be able to estimate a deposition amount of the above-described PM deposited on the above-described DPF, and a second intake flow rate correction part configured to decrease the above-described second intake flow rate, which is estimated by above-described the flow rate estimation part, in accordance with a second correction value, which is a correction value of the above-described second intake flow rate and is estimated from the above-described PM deposition amount estimated by the above-described PM deposition amount estimation part, based on a fifth relationship representing a relationship between the above-described second correction value and the above-described PM deposition amount estimated by the above-described PM deposition amount estimation part.

With the above configuration (5), the second intake flow rate correction part is configured to decrease the second intake flow rate estimated by the flow rate estimation part, in accordance with the second correction value which is estimated from the PM deposition amount estimated by the PM deposition amount estimation part. The corrected second intake flow rate, which is obtained by decreasing the second intake flow rate estimated by the flow rate estimation part in accordance with the second correction value, is increased in accuracy by reflecting the decrease in volumetric efficiency caused by the PM deposition amount on the DPF thereon. Thus, with the above configuration, it is possible to improve estimation accuracy of the second intake flow rate.

(6) In some embodiments, in the control device according to the above configuration (4) or (5), the above-described PM deposition amount estimation part is configured to estimate the above-described PM deposition amount according to the above-described first intake flow rate, in the above-described forced regeneration process, and configured to estimate the above-described PM deposition amount according to the above-described second intake flow rate which is different from the above-described first intake flow rate, in the above-described normal operation.

With the above configuration (6), the PM deposition amount estimation part estimates the PM deposition amount according to the first intake flow rate, in the forced regeneration process, and estimates the PM deposition amount according to the second intake flow rate which is different from the first intake flow rate, in the normal operation. That is, the estimation method for the intake flow rate is different between the forced regeneration process and the normal operation, and the intake flow rate used to estimate the PM deposition amount is also different between the forced regeneration process and the normal operation. Using the estimation methods for the intake flow rates suitable for the forced regeneration process and the normal operation, respectively, it is possible to improve estimation accuracy of the first intake flow rate in the forced regeneration process and the second intake flow rate in the normal operation, and to improve estimation accuracy of the PM deposition amount estimated by the first intake flow rate and the second intake flow rate.

(7) In some embodiments, in the control device according to the above configuration (6), the above-described engine further includes an EGR passage for connecting an intake passage and the above-described exhaust passage of the above-described engine, and for returning a part of an exhaust gas, which is discharged from the above-described engine, to the above-described intake passage as an EGR gas, and an EGR valve configured to be able to adjust a flow rate of the above-described EGR gas flowing through the above-described EGR passage, and the above-described flow rate estimation part is configured to estimate the flow rate of the above-described EGR gas from the above-described second state amount and an opening degree of the above-described EGR valve, based on a third relationship representing a relationship between the flow rate of the above-described EGR gas flowing through the above-described EGR passage, and the above-described second state amount and the opening degree of the above-described EGR valve, and the above-described PM deposition amount estimation part is configured to estimate the above-described PM deposition amount according to a first exhaust flow rate, which is an exhaust flow rate of an exhaust gas discharged from the above-described cylinder in the above-described forced regeneration process and corresponds to the above-described first intake flow rate, in the above-described forced regeneration process, and configured to estimate the above-described PM deposition amount according to an exhaust flow rate removing the flow rate of the above-described EGR gas flowing through the above-described EGR passage from a second exhaust flow rate, which is an exhaust flow rate of the exhaust gas discharged from the cylinder in the above-described normal operation and corresponds to the above-described second intake flow rate, in the above-described normal operation.

With the above configuration (7), the PM deposition amount estimation part estimates the PM deposition amount according to the first exhaust flow rate corresponding to the first intake flow rate in the forced regeneration process, and estimates the PM deposition amount according to the exhaust flow rate (third exhaust flow rate) removing the flow rate of the EGR gas flowing through the EGR passage from the second exhaust flow rate corresponding to the second intake flow rate in the normal operation. That is, between the forced regeneration process and the normal operation, the exhaust flow rate used to estimate the PM deposition amount is different. Estimating the PM deposition amount by the exhaust flow rates suitable for the forced regeneration process and the normal operation, respectively, it is possible to improve estimation accuracy of the estimated PM deposition amount. In particular, in the normal operation, removing the flow rate of the EGR gas flowing to the EGR passage from the exhaust flow rate, estimation accuracy of the estimated PM deposition amount is to be improved.

(8) In some embodiments, in the control device according to any one of the above configurations (1) to (7), the above-described engine further includes an atmospheric pressure acquisition device configured to acquire an atmospheric pressure value, and the above-described control device further includes a third intake flow rate correction part configured to increase/decrease the above-described intake flow rate, which is estimated by the above-described flow rate estimation part, in accordance with a third correction value, which is a correction value of the above-described intake flow rate and is estimated from the above-described atmospheric pressure value acquired by the above-described atmospheric pressure acquisition device, based on a sixth relationship representing a relationship between the above-described third correction value and the above-described atmospheric pressure value acquired by the above-described atmospheric pressure acquisition device.

With the above configuration (8), the third intake flow rate correction part is configured to increase/decrease the intake flow rate estimated by the flow rate estimation part, in accordance with the third correction value estimated from the atmospheric pressure value (measurement value). An oxygen density of the combustion gas is in a proportional relationship with the atmospheric pressure, and if atmospheric pressure decreases, the amount of oxygen sent to the combustion chamber at once is decreased, inevitably decreasing intake efficiency. Conversely, if the atmospheric pressure increases, intake efficiency improves. The corrected intake flow rate, which is obtained by increasing/decreasing the intake flow rate (first intake flow rate, second intake flow rate) estimated by the flow rate estimation part in accordance with the third correction value, is increased in accuracy by reflecting an atmospheric pressure variation thereon. Thus, with the above configuration, it is possible to improve estimation accuracy of the intake flow rate.

(9) An engine according to at least one embodiment of the present invention includes the control device according to any one of the above configurations (1) to (8), the above-described DOC, the above-described DPF, and the above-described temperature increase unit including the above-described exhaust throttle valve.

With the above configuration (9), with the control device, the engine can accurately estimate the first intake flow rate which is the intake flow rate in the forced regeneration process and the second intake flow rate which is the intake flow rate in the normal operation where the forced regeneration process is not executed. Thus, with the above configuration, the engine can accurately estimate the intake flow rate of the combustion gas sent into the cylinder of the engine, without using the air flow sensor.

(10) A control method of an engine according to at least one embodiment of the present invention is a control method of an engine, which includes a DOC disposed in an exhaust passage of the engine, a DPF disposed downstream of the above-described DOC in the above-described exhaust passage, and a temperature increase unit for increasing a temperature of each of the above-described DOC and the above-described DPF, for executing a forced regeneration process of removing PM deposited on the above-described DPF by increasing the temperature of the above-described DPF. The above-described temperature increase unit includes an exhaust throttle valve disposed in the above-described exhaust passage. The above-described control method of the engine includes an intake flow rate estimation step of estimating an intake flow rate of a combustion gas sent into a cylinder of the above-described engine. The above-described intake flow rate estimation step includes a first intake flow rate estimation step of estimating a first intake flow rate, which is the above-described intake flow rate in the above-described forced regeneration process, from an opening degree of the above-described exhaust throttle valve and a first state amount which indicates an operation state of the above-described engine including a rotation speed of the above-described engine, based on a first relationship representing a relationship between the above-described first intake flow rate, and the opening degree of the above-described exhaust throttle valve and the above-described first state amount, in the above-described forced regeneration process.

With the above method (10), in the first intake flow rate estimation step, it is possible to accurately estimate the corresponding first intake flow rate from the first state amount and the first opening degree based on the first relationship, that is, the relationship between the above-described first intake flow rate, and the above-described first opening degree and the above-described first state amount. In the forced regeneration process, the control device performs control of reducing (decreasing) the opening degree of the exhaust throttle valve. Using the first opening degree, that is, the opening degree of the exhaust throttle valve in the forced regeneration process to estimate the first intake flow rate, it is possible to estimate the first intake flow rate considering the decrease in volumetric efficiency which is caused by reducing the opening degree of the exhaust throttle valve. Thus, with the above method, it is possible to accurately estimate the intake flow rate of the combustion gas sent into the cylinder of the engine, without using the air flow sensor.

Advantageous Effects

According to at least one embodiment of the present invention, provided is a control device capable of accurately estimating an intake flow rate of a combustion gas before combustion sent into a cylinder, without using an air flow sensor.

DETAILED DESCRIPTION

Figure 1:
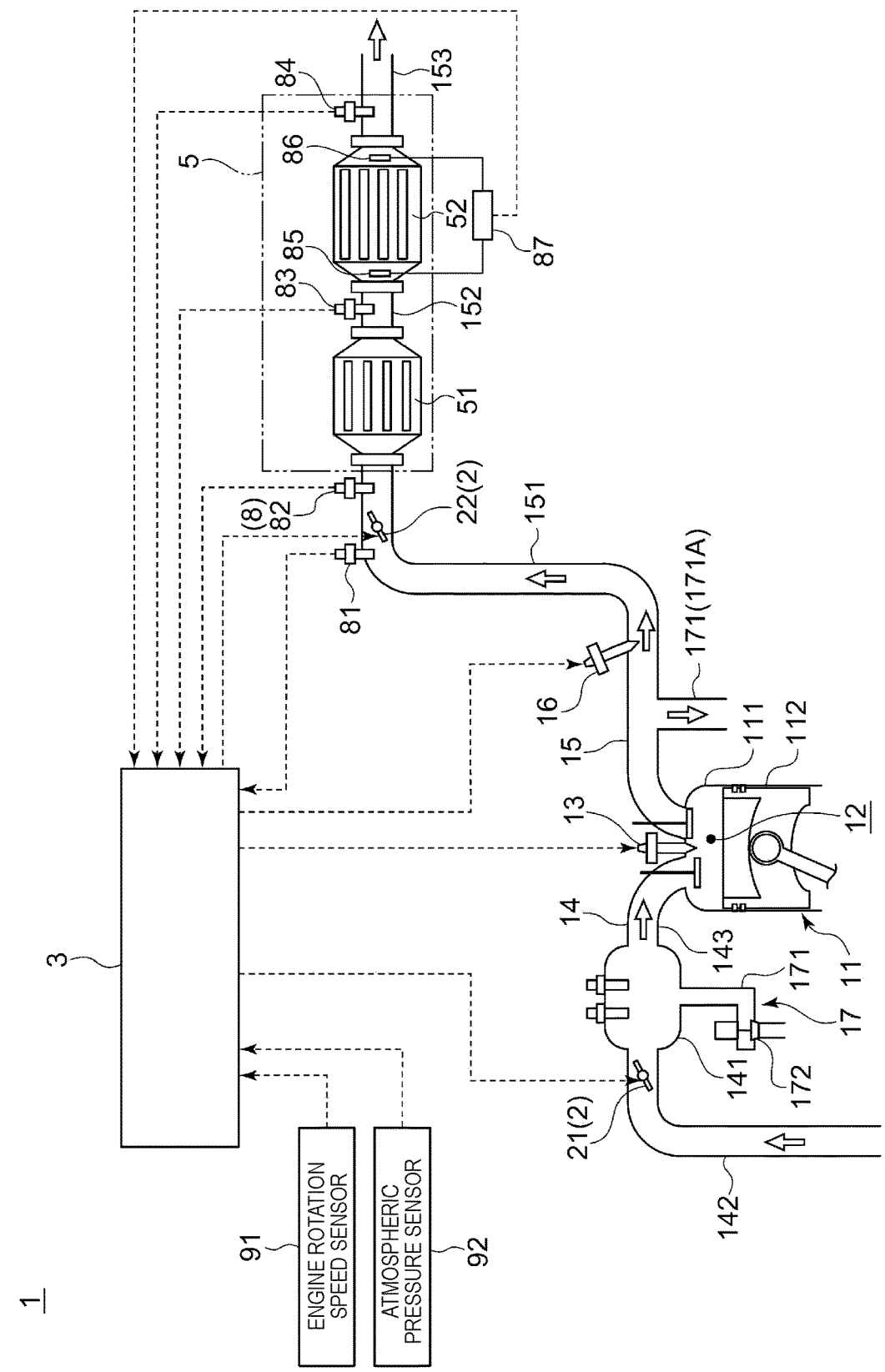
FIG. 1 is a schematic configuration diagram schematically showing an example of the overall configuration of an engine including a control device according to an embodiment of the present invention.

Some embodiments of the present invention will be described below with reference to the accompanying drawings. It is intended, however, that unless particularly identified, dimensions, materials, shapes, relative positions and the like of components described or shown in the drawings as the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same", "equal", and "uniform" shall not be construed as indicating only the state in which the feature is strictly equal, but also includes a state in which there is a tolerance or a difference that can still achieve the same function.

Further, for instance, an expression of a shape such as a rectangular shape or a tubular shape shall not be construed as only the geometrically strict shape, but also includes a shape with unevenness or chamfered corners within the range in which the same effect can be achieved.

On the other hand, the expressions "comprising", "including", "having", "containing", and "constituting" one constituent component are not exclusive expressions that exclude the presence of other constituent components.

The same configurations are indicated by the same reference characters and may not be described again in detail.

FIG. 1 is a schematic configuration diagram schematically showing an example of the overall configuration of an engine including a control device according to an embodiment of the present invention.

As shown in FIG. 1, an exhaust gas purification device 5 includes a DOC 51 and a DPF 52. A control device 3 regenerates (recovers) the exhaust gas purification device 5 disposed in an exhaust passage 15 of an engine 1 by controlling a temperature increase unit 6 to be described later.

First, the engine 1 (diesel engine) including the control device 3 will be described.

In the illustrated embodiment, as shown in FIG. 1, the engine 1 mainly includes the above-described control device 3, the above-described exhaust gas purification device 5, an engine body 11 with a combustion chamber 12 which is defined by a cylinder 111 including a cylinder head and a cylinder block and a piston 112 disposed in the cylinder 111, a fuel injection valve 13 for injecting a non-combusted fuel to the combustion chamber 12, an intake passage 14 of the engine 1, the exhaust passage 15 of the engine 1, and a throttle valve 2 disposed in the intake passage 14 or the exhaust passage 15 of the engine 1. In the embodiment shown in FIG. 1, the engine 1 is not provided with a supercharger such as a turbocharger or a supercharger, but is constituted by a naturally aspirated engine (NA engine) which takes air into the cylinder at the atmospheric pressure.

The engine body 11 is connected to the intake passage 14 and the exhaust passage 15. The intake passage 14 of the engine 1 is a passage for sending air (combustion gas) outside the engine 1 to the combustion chamber 12. The exhaust passage 15 of the engine 1 is a passage for discharging an exhaust gas discharged from the combustion chamber 12 to the outside of the engine 1.

As shown in FIG. 1, the fuel injection valve 13 is connected to a common rail (not shown) for accumulating the non-combusted fuel (high-pressure fuel), and is configured to be able to inject the above-described non-combusted fuel. Then, the fuel injection valve 13 is configured such that an injection timing of the non-combusted fuel and an injection amount of the non-combusted fuel are controlled by the control device 3. In the illustrated embodiment, the fuel injection valve 13 is mounted on the engine body 11 and is configured to be able to inject the non-combusted fuel to the combustion chamber 12. In other embodiments, the fuel injection valve 13 is mounted in the vicinity of the combustion chamber 12 in the intake passage 14 and is configured to be able to inject the non-combusted fuel to the intake passage 14.

In main injection executed during the normal operation, the non-combusted fuel injected from the fuel injection valve 13 to the combustion chamber 12 or the intake passage 14 is mixed with the air (combustion gas) sent to the combustion chamber 12 via the intake passage 14, and then combusted in the combustion chamber 12. The exhaust gas having been combusted in the combustion chamber 12 is discharged outside the engine 1 through the exhaust passage 15.

The throttle valve 2 includes an intake throttle valve 21 disposed in the intake passage 14 and an exhaust throttle valve 22 disposed in the exhaust passage 15, as shown in FIG. 1. In the illustrated embodiment, the engine 1 includes both of the intake throttle valve 21 and the exhaust throttle valve 22. In other embodiments, the engine 1 includes only the exhaust throttle valve 22 of the intake throttle valve 21 and the exhaust throttle valve 22.

Each of the intake throttle valve 21 and the exhaust throttle valve 22 includes a motor and an actuator (both of which are not shown) operating in accordance with a signal sent from the control device 3, and is configured to be changeable to an opening degree according to an instructed opening degree instructed by the control device 3. The intake throttle valve 21 can adjust the flow rate of the air (combustion gas) sent to the combustion chamber 12, by being set at the opening degree according to the instructed opening degree instructed by the control device 3. The exhaust throttle valve 22 can adjust the flow rate of an exhaust gas flowing downstream of the exhaust throttle valve 22 in the exhaust passage 15, by being set at the opening degree according to the instructed opening degree instructed by the control device 3.

As shown in FIG. 1, the above-described exhaust gas purification device 5 is a device for purifying the exhaust gas discharged from the engine body 11, and includes the above-described DOC 51 (diesel oxidization catalyst) disposed in the exhaust passage 15 and the above-described DPF 52 (diesel particulate filter) disposed downstream of the DOC 51 in the exhaust passage 15. The DPF 52 is configured to be able to collect particulate matters (PM), such as soot, contained in the exhaust gas discharged from the engine body 11. In the illustrated embodiment, the DOC 51 is disposed downstream of the exhaust throttle valve 22 in the exhaust passage 15.

The DOC 51 has a number of vent holes formed into a honeycomb shape, and includes a body of ceramic or metal which is configured to have an outer shape formed into a cylindrical shape or a cuboidal shape, and an oxidation catalyst supported by an inner surface of the body. The DOC 51 has a function to oxidize and remove non-combusted fuel (HC) and carbon monoxide (CO) in the exhaust gas passing through the DOC 51, and to oxidize nitrogen monoxide (NO) in the exhaust gas to produce nitrogen dioxide ($NO_2$) capable of combusting and removing PM by a reaction with the PM collected by the DPF 52, by accelerating an oxidation reaction by the oxidation catalyst. Moreover, the DOC 51 has a function to increase the temperature of the exhaust gas passing through the DOC 51 and to increase the inlet temperature of the DPF 52 with heat generated by an oxidation reaction of the non-combusted fuel contained in the exhaust gas, in forced regeneration of the DPF.

The DPF 52 has a number of vent holes formed into a honeycomb shape, and is configured to have an outer shape formed into a cylindrical shape or a cuboidal shape. The DPF 52 is configured such that vent holes adjacent to each other of a number of vent holes are closed alternately on the inlet side and the outlet side to allow the exhaust gas to pass through a filtering wall (filter). Thus, the PM is removed when the exhaust gas passes through the filtering wall. The DPF 52 may support the oxidation catalyst on the inner surface thereof.

The exhaust gas sent to the exhaust gas purification device 5 is discharged outside the engine 1 after non-combusted fuel (HC) and carbon monoxide (CO) contained in the exhaust gas are removed in the DOC 51, and the PM contained in the exhaust gas is removed in the DPF 52.

While a part of the PM removed in the DPF 52 is combusted (continuous regeneration) by a high-temperature exhaust gas discharged from the combustion chamber 12 during an engine operation (during the normal operation), the remaining PM is deposited on the filtering wall of the DPF 52. Thus, the control device 3 needs to execute the forced regeneration process of regenerating the filtering wall by forcibly combusting the PM deposited on the filtering wall of the DPF 52.

In the illustrated embodiment, as shown in FIG. 1, the exhaust passage 15 includes a first exhaust pipe 151 connecting a discharge port of the engine body 11 and upstream of the DOC 51, a second exhaust pipe 152 connecting downstream of the DOC 51 and upstream of the DPF 52, and a third exhaust pipe 153 connected to downstream of the DPF 52 and having an outlet opening for discharging the exhaust gas. The above-described exhaust throttle valve 22 is disposed in the first exhaust pipe 151.

As shown in FIG. 1, in the first exhaust pipe 151, an exhaust pressure sensor 81 and a DOC inlet temperature sensor 82 are disposed. The exhaust pressure sensor 81 detects a pressure in the vicinity of the exhaust throttle valve 22 as a pressure of the exhaust gas discharged from the combustion chamber 12. The DOC inlet temperature sensor 82 detects the inlet temperature of the DOC 51 as the temperature of the exhaust gas discharged from the combustion chamber 12. As shown in FIG. 1, in the second exhaust pipe 152, a DPF inlet temperature sensor 83 for detecting the inlet temperature of the DPF 52 is disposed. As shown in FIG. 1, in the third exhaust pipe 153, a DPF outlet temperature sensor 84 for detecting the outlet temperature of the DPF 52 is disposed. In the DPF 52, a DPF inlet pressure sensor 85, a DPF outlet pressure sensor 86, and a DPF differential pressure sensor 87 are disposed. Signals regarding the pressure of the exhaust gas, the inlet temperature of the DOC 51, the inlet temperature of the DPF 52, the outlet temperature of the DPF 52, the differential pressure of the DPF 52, and the like measured by the above-described sensors, respectively, are input to the control device 3 via an input/output part 31 (see FIG. 2).

Moreover, in the illustrated embodiment, as shown in FIG. 1, the intake passage 14 includes an intake manifold 141, a first intake pipe 142 connected to upstream of the intake manifold, and a second intake pipe 143 connecting downstream of the intake manifold 141 and a supply port of the engine body 11. The above-described intake throttle valve 21 is disposed in the first intake pipe 142.

In the illustrated embodiment, the control device 3 is an ECU device (electronic control unit) for controlling the engine 1. In other embodiments, the control device 3 may be implemented as one of functions (programs and circuits) of the ECU device. Alternatively, the control device 3 may be configured as another electronic control unit including a processor, independently of the above-described ECU device. The control device 3 may be configured as a microcomputer including a central processing unit (CPU), a random access memory (RAM), a read only memory (ROM), an I/O interface, and the like. Moreover, the control device 3 is configured to be able to perform control on the basis of the signals measured by the sensors, respectively, described above on the fuel injection valve 13, the intake throttle valve 21, the exhaust throttle valve 22, and the like.

Figure 2:
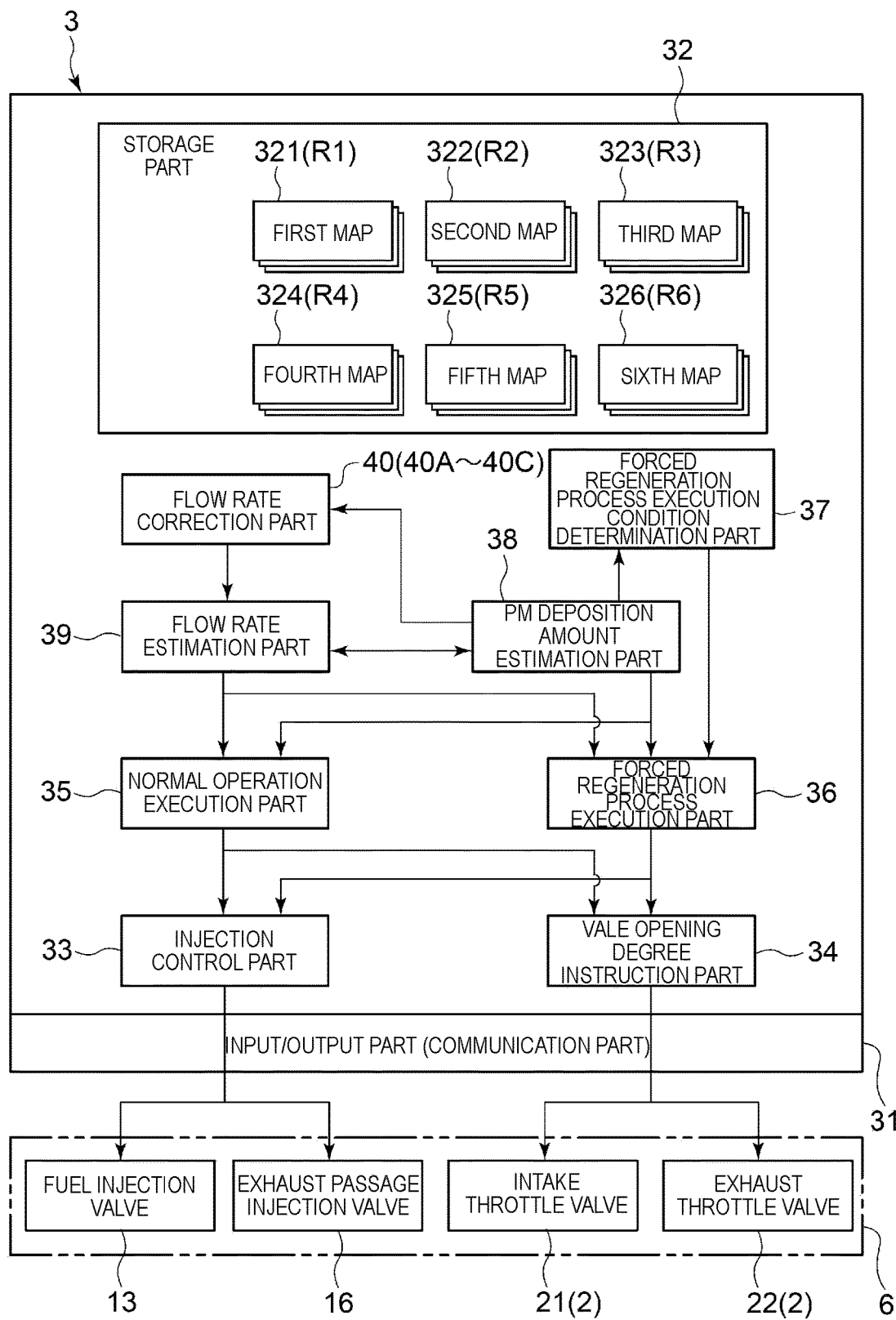
FIG. 2 is a block diagram showing an example of the control device according to an embodiment of the present invention.

FIG. 2 is a block diagram showing an example of the control device according to an embodiment of the present invention.

As shown in FIG. 2, the above-described temperature increase unit 6 includes the fuel injection valve 13 and the exhaust throttle valve 22. As shown in FIG. 2, the temperature increase unit 6 may further include at least one of the intake throttle valve 21 or an exhaust passage injection valve 16 to be described later.

The control device 3 is configured to be able to execute the above-described forced regeneration process of removing the PM deposited on the DPF 52 by increasing the temperature of the DPF 52 with the temperature increase unit 6. The control device 3 is configured to be able to control the temperature increase unit 6 not only during execution of the forced regeneration process but also during the normal operation.

In the illustrated embodiment, as shown in FIG. 2, the control device 3 includes the above-described input/output part 31, a storage part 32, an injection control part 33 for controlling execution of injection by the fuel injection valve 13, a valve opening degree instruction part 34 for controlling throttling of the exhaust throttle valve 2 (intake throttle valve 21, exhaust throttle valve 22), a normal operation execution part 35, a forced regeneration process execution part 36, a forced regeneration process execution condition determination part 37, a PM deposition amount estimation part 38, and a flow rate estimation part 39.

The injection control part 33 is configured to be able to control the injection timing of the non-combusted fuel and the injection amount of the non-combusted fuel injected by the fuel injection valve 13. The valve opening degree instruction part 34 is configured to instruct the throttle valve 2 on an instructed opening degree of the throttle valve 2.

Figure 3:
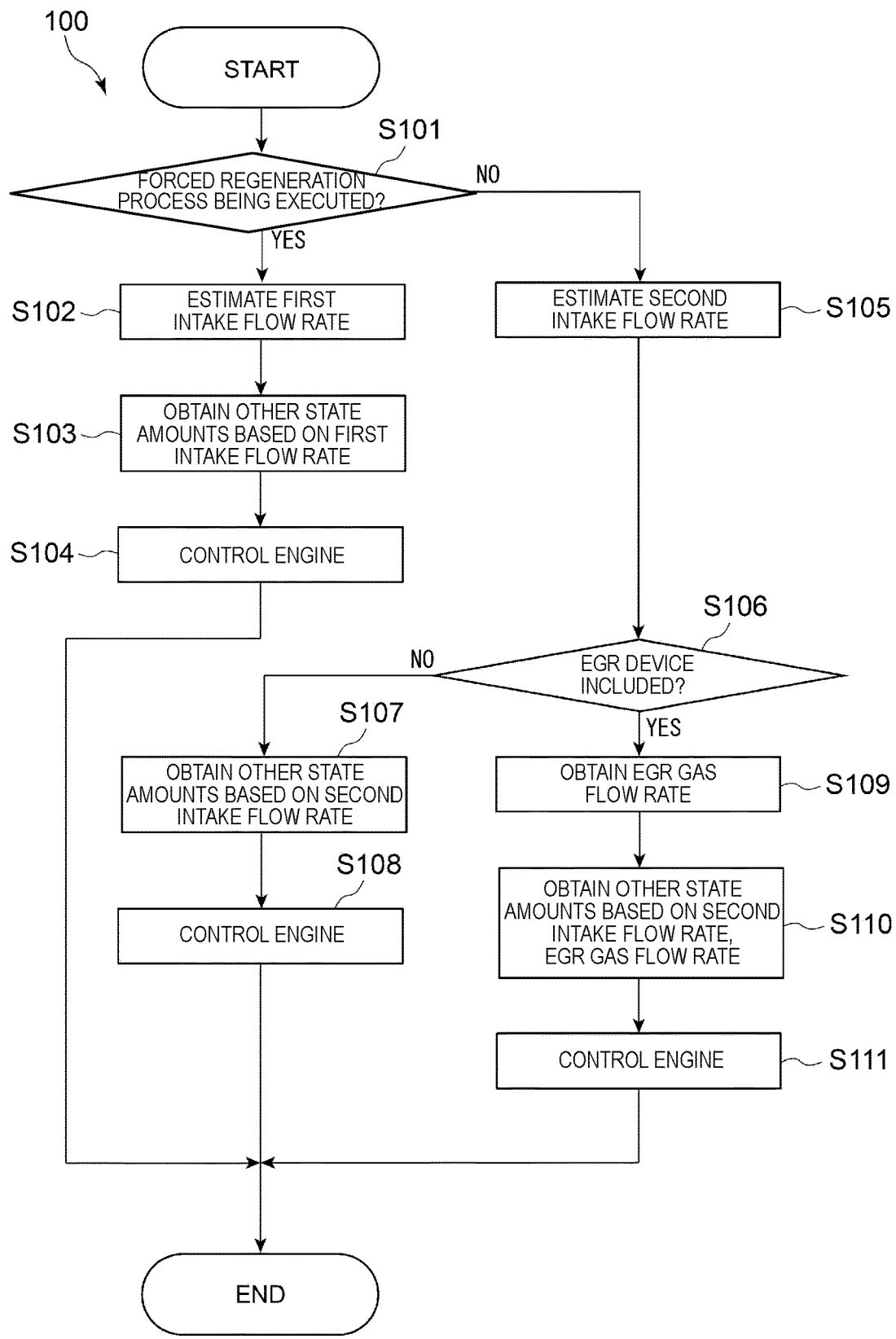
FIG. 3 is a flowchart for describing a control logic of the control device according to an embodiment of the present invention.
Figure 4:
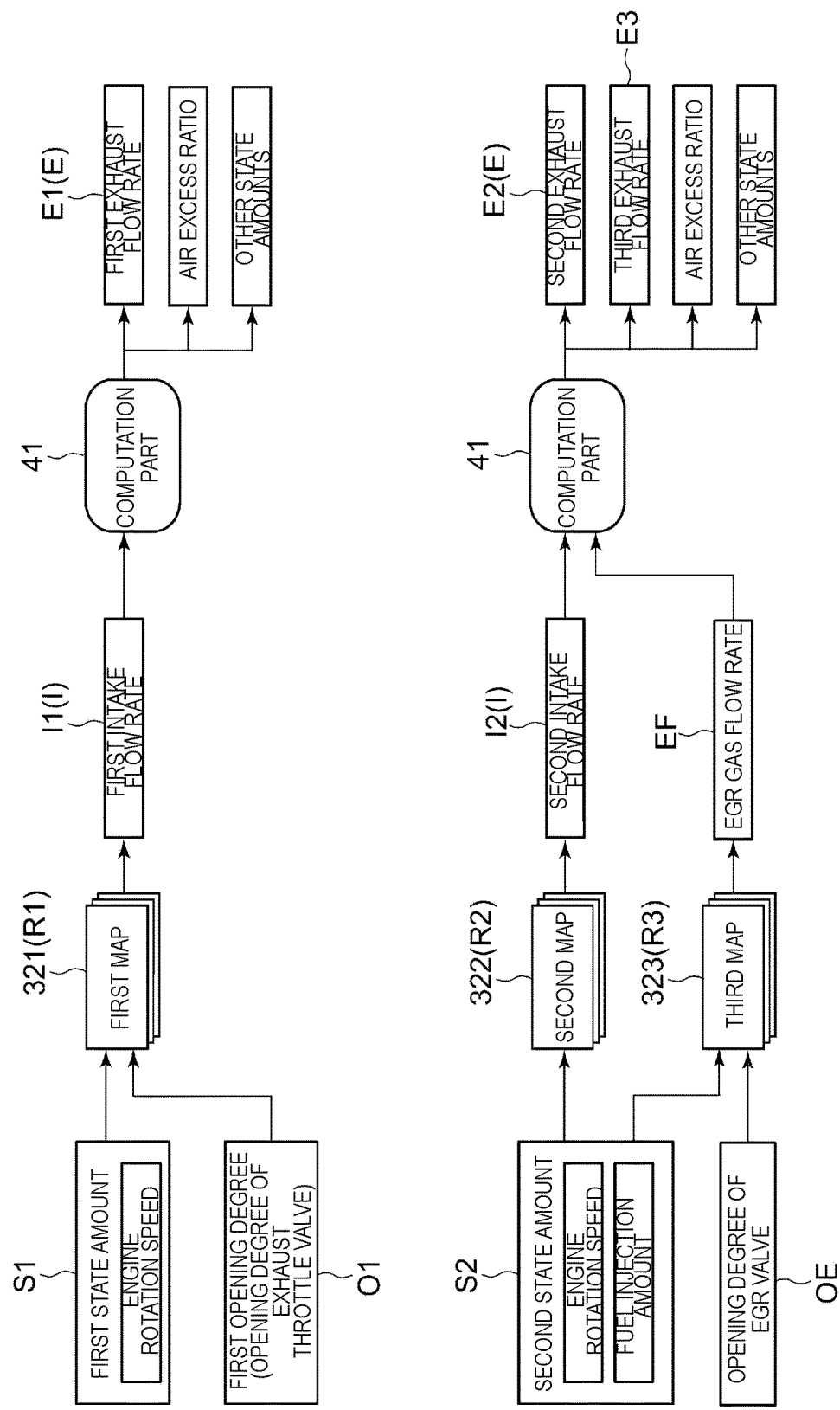
FIG. 4 is a data flow diagram for describing the control device according to an embodiment of the present invention.

FIG. 3 is a flowchart for describing a control logic of the control device according to an embodiment of the present invention. FIG. 4 is a data flow diagram for describing the control device according to an embodiment of the present invention.

As shown in FIG. 3, the control device 3 causes the forced regeneration process execution part 36 to execute the forced regeneration process, if the forced regeneration process is being executed ("Yes" in S101). More specifically, the forced regeneration process execution part 36 is configured to instruct the injection control part 33 and the valve opening degree instruction part 34 to perform corresponding control in the forced regeneration process. Moreover, if the forced regeneration process is not being executed ("No" in S101), the normal operation execution part 35 performs control in the normal operation. More specifically, the normal operation execution part 35 is configured to instruct the injection control part 33 and the valve opening degree instruction part 34 to perform the corresponding control in the forced regeneration process.

The forced regeneration process is started, if the forced regeneration process execution condition determination part 37 determines that a forced regeneration process execution condition is satisfied. The normal operation is continued, if the forced regeneration process execution condition determination part 37 determines that the forced regeneration process execution condition is not satisfied. That is, the forced regeneration process execution condition determination part 37 is configured to be able to determine whether the forced regeneration process execution condition is satisfied. Moreover, the forced regeneration process execution part 36 is configured to execute the forced regeneration process (automatic regeneration process), if the forced regeneration process execution condition is satisfied. The forced regeneration process includes an automatic regeneration process automatically executed by the control device 3 by satisfying the above-described forced regeneration process execution condition, and a manual regeneration process executed by a manual operation.

The forced regeneration process execution condition includes, for example, an estimated value of the PM deposition amount on the filtering wall of the DPF 52 exceeding a predetermined value, an operation time of the engine body 11 exceeding a predetermined time, and a cumulative of the fuel injection amount of the fuel injection valve 13 exceeding a predetermined value. In the illustrated embodiment, the forced regeneration process execution condition determination part 37 determines that the forced regeneration process execution condition is satisfied, if at least one of the estimated value of the PM deposition amount exceeding the predetermined value, the operation time of the engine body 11 exceeding the predetermined time, or the cumulative of the fuel injection amount of the fuel injection valve 13 exceeding the predetermined value is satisfied.

In the illustrated embodiment, the forced regeneration process execution condition determination part 37 is connected to the PM deposition amount estimation part 38 and is configured to be able to obtain the estimated value of the PM deposition amount on the DPF 52 from the PM deposition amount estimation part 38. The PM deposition amount estimation part 38 is configured to estimate the PM deposition amount on the DPF 52.

Figure 5:
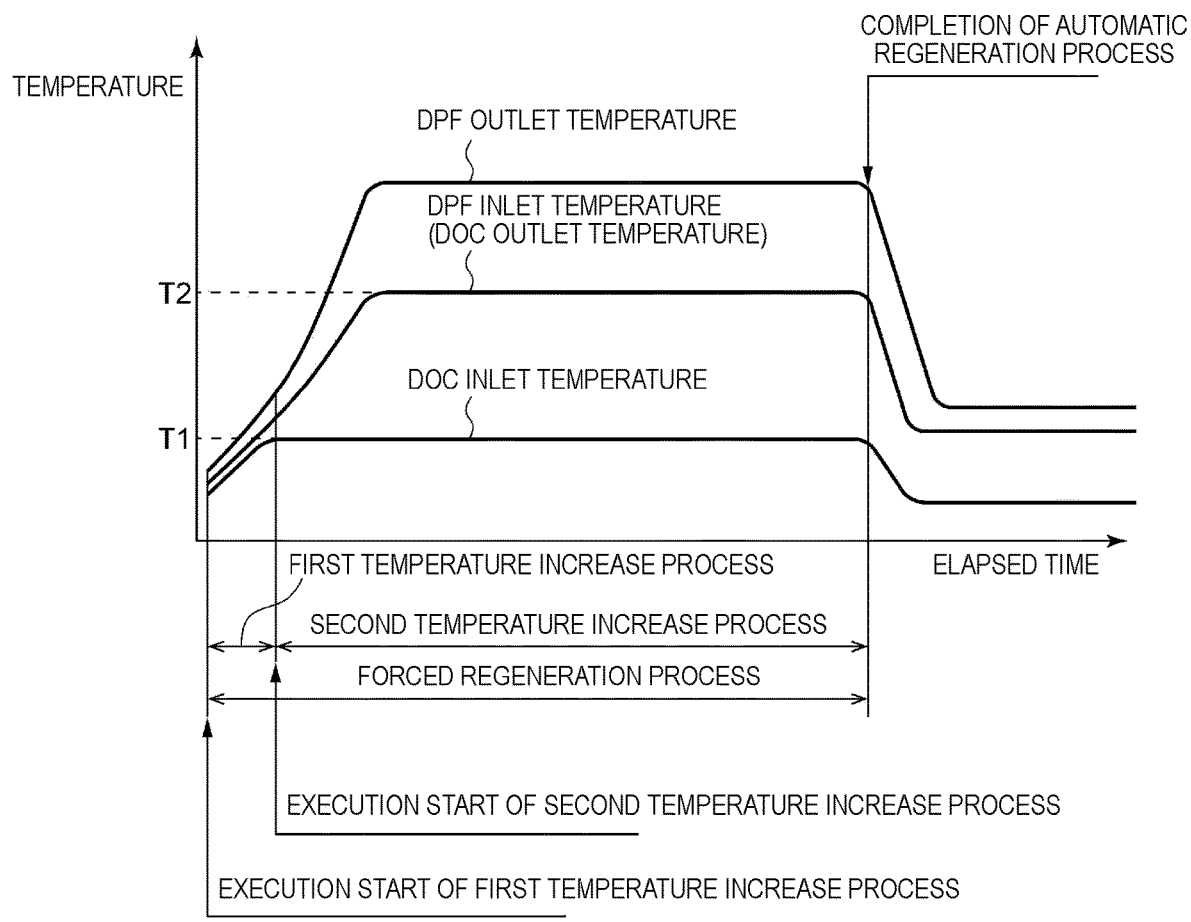
FIG. 5 is a graph showing respective temperature changes of DPF inlet and outlet temperatures, and DOC inlet and outlet temperatures during an automatic regeneration process.
Figure 6:
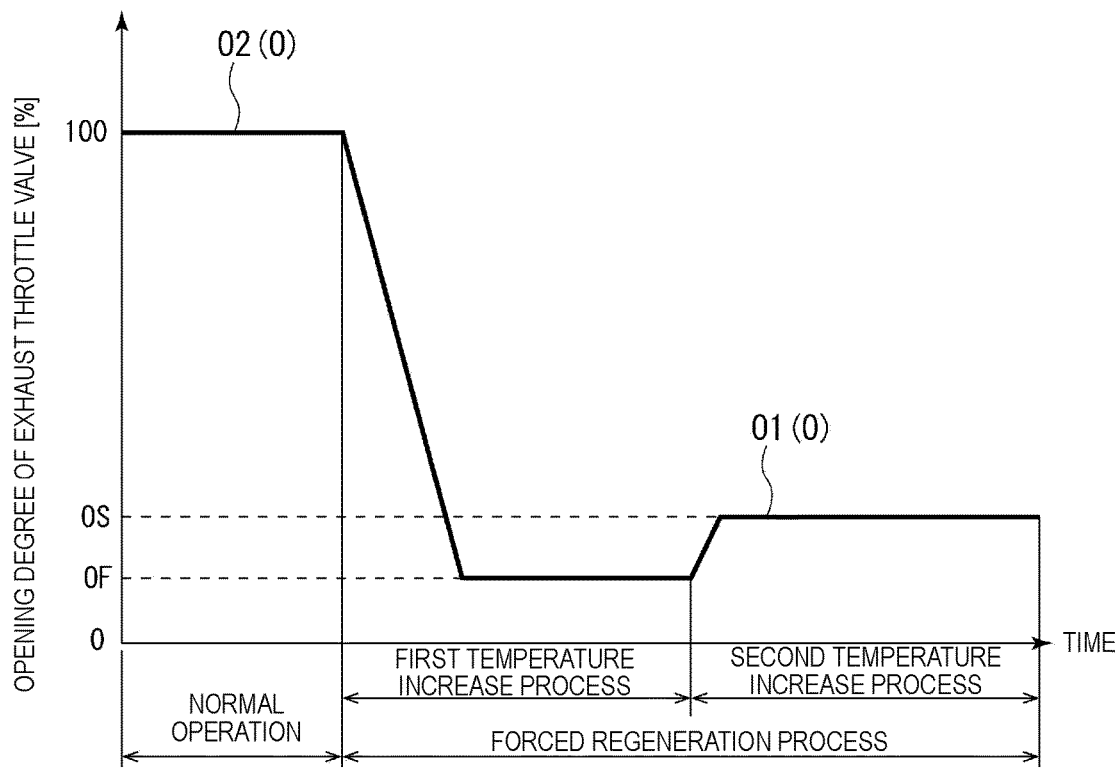
FIG. 6 is a graph for describing the opening degree of an exhaust throttle valve in a normal operation and in a forced regeneration process.

FIG. 5 is a graph showing respective temperature changes of DPF inlet and outlet temperatures, and DOC inlet and outlet temperatures during the automatic regeneration process. FIG. 6 is a graph for describing the opening degree of the exhaust throttle valve in the normal operation and in the forced regeneration process.

As shown in FIG. 5, the forced regeneration process (automatic regeneration process) includes a first temperature increase process and a second temperature increase process executed after the first temperature increase process.

In the first temperature increase process, as shown in FIG. 5, the forced regeneration process execution part 36 controls the temperature increase unit 6 such that the inlet temperature of the DOC 51 is increased to a first temperature T1 which is an activation temperature (for example, 250° C.) at which the DOC 51 is activated. In the illustrated embodiment, as shown in FIG. 6, with the exhaust throttle valve 22 serving as the temperature increase unit 6, the inlet temperature of the DOC 51 is increased by decreasing an opening degree O of the exhaust throttle valve 22 to reduce the flow rate of the exhaust gas flowing downstream of the exhaust throttle valve 22 in the exhaust passage 15.

Let an opening degree of the exhaust throttle valve 22 in the forced regeneration process be a first opening degree O1, and let an opening degree of the exhaust throttle valve 22 in the normal operation be a second opening degree O2. The second opening degree O2 is a fully (100%) or nearly fully opening degree. The first opening degree O1 in the first temperature increase process is reduced from the second opening degree O2 to be an opening degree OF which is less than the second opening degree O2. In the embodiment shown in FIG. 6, the opening degree OF falls within a range of not less than 10% and not greater than 20%.

In other embodiments, with the fuel injection valve 13 serving as the temperature increase unit 6, the inlet temperature of the DOC 51 disposed downstream of the cylinder 111 in a flow direction of the exhaust gas discharged from the cylinder 111 may be increased by increasing the temperature of the exhaust gas without influencing the output of the engine 1 in early-post injection. Moreover, with a common rail pressure control unit (not shown) for controlling a common rail pressure, at which the fuel is injected, serving as the temperature increase unit 6, the inlet temperature of the DOC 51 may be increased by controlling the common rail pressure. Moreover, with at least two of the exhaust throttle valve 22, the fuel injection valve 13, or the common rail pressure control unit (not shown) serving as the temperature increase units 6, the inlet temperature of the DOC 51 may be increased. The early-post injection is a first post injection where a smaller amount of fuel than in main injection is injected while a pressure in the combustion chamber 12 immediately after injection of a main fuel is still high, in the step of injecting the fuel to the combustion chamber 12. In the early-post injection, unlike late-post injection to be described later, the fuel is injected after the main injection and at a timing contributing to combustion in the combustion chamber 12.

In the second temperature increase process, as shown in FIG. 5, the forced regeneration process execution part 36 controls the temperature increase unit 6 such that the DPF 52 is increased to a second temperature T2 which is higher than the first temperature T1, after completion of the first temperature increase process. In the illustrated embodiment, as shown in FIG. 6, with the exhaust throttle valve 22 serving as the temperature increase unit 6, the opening degree (first opening degree O1) of the exhaust throttle valve 22 is opened to an opening degree OS which is greater than the opening degree OF to increase the flow rate of the exhaust gas flowing downstream of the exhaust throttle valve 22 in the exhaust passage 15. Moreover, in the illustrated embodiment, the fuel injection valve 13 further serves as the temperature increase unit 6. During the second temperature increase process, the above-described injection control part 33 instructs the fuel injection valve 13 on the late-post injection. With the late-post injection, the non-combusted fuel flows out of the combustion chamber 12 to the exhaust passage 15, and the discharged non-combusted fuel flows into the DOC 51 to be oxidized and generate heat, thereby increasing the inlet temperature of the DPF 52 to the second temperature T2. Moreover, since the temperature of the DPF 52 is increased to the second temperature T2, it is possible to combust the PM deposited on the DPF 52. In other embodiments, during the second temperature increase process, the above-described injection control part 33 instructs the fuel injection valve 13 on the early-post injection and the late-post injection. The late-post injection is a second post injection where the fuel is injected at a timing (in the vicinity of a bottom dead center) that does not contribute to combustion in the combustion chamber 12 after the early-post injection.

In place of or in conjunction with the late-post injection of the fuel injection valve 13, the non-combusted fuel may be injected from the exhaust passage injection valve 16 (see FIG. 1) disposed in the exhaust passage 15. In this case, the injection control part 33 may control execution of injection of the non-combusted fuel not only by the fuel injection valve 13 but also by the exhaust passage injection valve 16. That is, the injection control part 33 is configured to be able to control the injection timing of the non-combusted fuel and the injection amount of the non-combusted fuel injected by the exhaust passage injection valve 16.

The flow rate estimation part 39 is configured to estimate an intake flow rate I of the combustion gas sent into the cylinder 111 of the engine 1. As shown in FIG. 3, the flow rate estimation part 39 is configured to estimate a first intake flow rate I1 which is the intake flow rate I in the forced regeneration process, in the forced regeneration process (S102). In addition, as shown in FIG. 3, the flow rate estimation part 39 is configured to estimate a second intake flow rate I2 which is the intake flow rate I in the normal operation, in a normal regeneration process (S105).

The present inventors have found that since the exhaust throttle valve 22 is fully opened or nearly fully opened in the normal operation, it is possible to estimate the second intake flow rate I2 which is the intake flow rate I in the normal operation based on the operation state of the engine 1; however, since the opening degree of the exhaust throttle valve 22 is reduced, resulting in an increase in back pressure (the pressure of the exhaust passage) and a decrease in volumetric efficiency in the forced regeneration process, it is difficult to estimate the first intake flow rate I1 which is the intake flow rate I in the forced regeneration process based on only the operation state of the engine 1.

Moreover, as a result of intensive researches, the present inventors have found that it is possible to accurately estimate the first intake flow rate I1 from a first state amount S1 and the first opening degree O1, as shown in FIG. 4. The first state amount S1 indicates an operation state of the engine including the rotation speed of the engine in the forced regeneration process, and the first opening degree O1 is the opening degree of the exhaust throttle valve 22 in the forced regeneration process.

In some embodiments, the above-described control device 3 includes the above-described flow rate estimation part 39. Then, the above-described flow rate estimation part 39 is configured to estimate the first intake flow rate, which is the intake flow rate I in the forced regeneration process, from the first state amount S1 and the first opening degree O1 described above, based on a first relationship R1 representing a relationship between the first intake flow rate I1, and the first state amount S1 and the first opening degree O1, in the forced regeneration process.

The "first relationship R1" indicates a correspondence relationship between the first intake flow rate I1, and the first state amount S1 and the first opening degree O1, and it is only necessary that when the first state amount S1 and the first opening degree O1 are input, the first intake flow rate I1 corresponding to the input first state amount S1 and first opening degree O1 can be specified and obtained. The first relationship R1 includes estimated equations such as a first map 321 to be described later, a figure or a table, a database, and an approximate curve created in advance by conducting an experiment and the like.

In the illustrated embodiment, as shown in FIG. 4, the first map 321 (first relationship R1), which includes the first opening degree O1 and the first state amount S1 including the engine rotation speed as input values, and the first intake flow rate I1 as an output value, is prestored in the storage part 32 (see FIG. 2). With the first map 321, the flow rate estimation part 39 obtains an estimated value of the first intake flow rate I1 from the first state amount S1 and the first opening degree O1. As the first opening degree O1, the instructed opening degree instructed for the throttle valve 2 by the valve opening degree instruction part 34 may be used. In this case, the opening degree of the exhaust throttle valve 22 need not be obtained from the outside of the control device 3, making it possible to quickly estimate the first intake flow rate I1. Moreover, as the engine rotation speed, a measurement value may be used, which is obtained from an engine rotation speed sensor 91 (see FIG. 1) for detecting the rotation speed of a shaft (rotational shaft member) (not shown) connected to the engine body 11. The engine rotation speed sensor 91 is connected to the control device 3 and is configured to transmit the above-described measurement value to the control device 3.

With the above configuration, it is possible to accurately estimate the corresponding first intake flow rate I1 from the first state amount S1 and the first opening degree O1 based on the first relationship R1, that is, the relationship between the first intake flow rate I1, and the first state amount S1 and the first opening degree O1. In the forced regeneration process, the control device 3 performs control of reducing (decreasing) the opening degree of the exhaust throttle valve 22. Using the first opening degree O1, that is, the opening degree of the exhaust throttle valve 22 in the forced regeneration process to estimate the first intake flow rate I1, it is possible to estimate the first intake flow rate I1 considering the decrease in volumetric efficiency which is caused by reducing the opening degree of the exhaust throttle valve 22. Thus, with the above configuration, it is possible to accurately estimate the intake flow rate I of the combustion gas sent into the cylinder 111 of the engine 1, without using an air flow sensor.

Since it is possible to accurately estimate the intake flow rate I of the combustion gas sent into the cylinder 111 of the engine 1, without using the air flow sensor, in the engine equipped with the air flow meter, it is possible to estimate the accurate intake flow rate even if the air flow meter fails, making it possible to improve reliability of the engine. Moreover, it is also possible to reduce a cost of the engine without equipping the engine with the air flow meter.

As described above, since the exhaust throttle valve 22 is fully opened or nearly fully opened in the normal operation, it is possible to estimate the second intake flow rate I2, which is the intake flow rate I in the normal operation, based on the operation state of the engine 1.

In some embodiments, the above-described flow rate estimation part 39 is configured to estimate the second intake flow rate I2, which is the intake flow rate I in the normal operation where the forced regeneration process is not executed, from a second state amount S2 which indicates an operation state of the engine including the rotation speed of the engine and a fuel injection amount, based on a second relationship R2 representing a relationship between the second state amount S2 and the second intake flow rate I2, in the normal operation. The fuel injection amount is the injection amount of the non-combusted fuel injected by the fuel injection valve 13, which is controlled by the injection control part 33 of the control device 3. That is, the control device 3 possesses the fuel injection amount as a control amount.

The "second relationship R2" indicates a correspondence relationship between the second state amount S2 and the second intake flow rate I2, and it is only necessary that when the second state amount S2 is input, the second intake flow rate I2 corresponding to the input second state amount S2 can be specified and obtained. The second relationship R2 includes estimated equations such as a second map 322 to be described later, a figure or a table, a database, and an approximate curve created in advance by conducting an experiment and the like.

In the illustrated embodiment, as shown in FIG. 4, the second map 322 (second relationship R2), which includes the second state amount S2 including the engine rotation speed and the fuel injection amount as an input value, and the second intake flow rate I2 as an output value, is prestored in the storage part 32 (see FIG. 2). With the second map 322, the flow rate estimation part 39 obtains an estimated value of the second intake flow rate I2 from the second state amount S2.

With the above configuration, it is possible to accurately estimate the corresponding second intake flow rate I2 from the second state amount S2 based on the second relationship R2, that is, the relationship between the second state amount S2 and the second intake flow rate I2. Thus, with the above configuration, it is possible to accurately estimate the intake flow rate (second intake flow rate I2) of the combustion gas sent into the cylinder 111 of the engine 1 in the normal operation, without using the air flow sensor.

As described above, the estimation methods for the intake flow rates I are different between the forced regeneration process and the normal operation. Thus using the estimation methods for the intake flow rates I suitable for the forced regeneration process and the normal operation, respectively, it is possible to improve estimation accuracy of the first intake flow rate I1 in the forced regeneration process and the second intake flow rate I2 in the normal operation.

In the illustrate embodiment, as shown in FIG. 4, although the above-described first state amount S1 does not include the fuel injection amount included in the above-described second state amount S2, an influence of the fuel injection amount on estimation of the first intake flow rate I1 is small, and thus it is possible to accurately estimate the first intake flow rate I1 even without the fuel injection amount. In particular, in the case of the NA engine, since the intake flow rate is determined by the capacity of the cylinder 111, the influence of the fuel injection amount is small.

Figure 7:
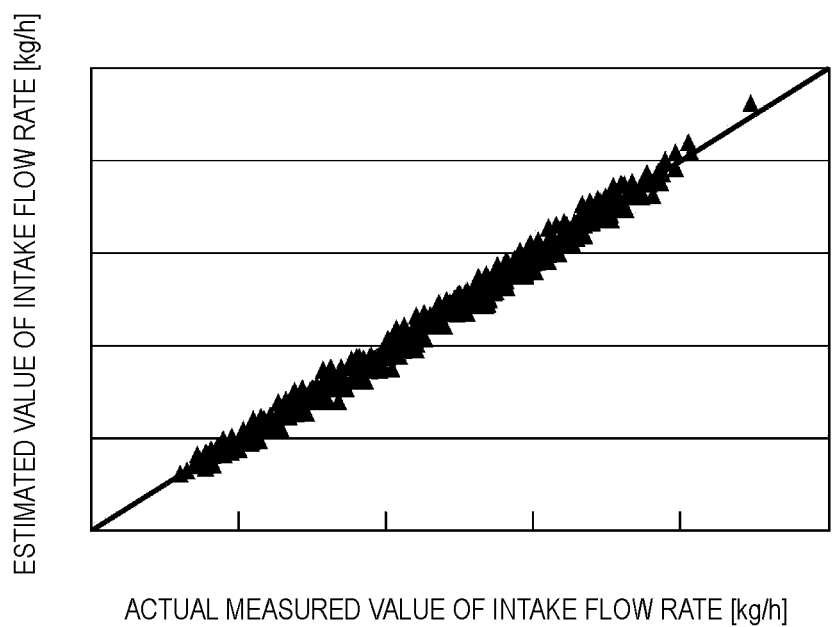
FIG. 7 is a graph for describing estimation accuracy of an intake flow rate.

FIG. 7 is a graph for describing estimation accuracy of the intake flow rate. As shown in FIG. 7, an estimated value of the second intake flow rate I2 shows a high concordance rate with an actual measured value of the second intake flow rate I2. As with the second intake flow rate I2 shown in FIG. 7, an estimated value of the first intake flow rate I1 shows a high concordance rate with an actual measured value of the first intake flow rate I1.

In some embodiments, as shown in FIG. 1, the above-described engine 1 further includes an EGR device 17 configured to return, upstream of the cylinder 111 of the engine 1, a part of the exhaust gas discharged from the cylinder 111 as an EGR gas. The EGR device 17 includes an EGR passage 171 for connecting the intake passage 14 and the exhaust passage 15 of the engine 1, and for returning the part of the exhaust gas, which is discharged from the cylinder 111, to the intake passage 14 as the EGR gas, and an EGR valve 172 configured to be able to adjust the flow rate of the EGR gas flowing through the EGR passage.

In the illustrated embodiment, the EGR passage 171 includes an EGR pipe 171A which has one end connected to upstream of the exhaust gas purification device 5 and the exhaust throttle valve 22 in the exhaust passage 15, and branches from the exhaust passage 15. The EGR pipe 171A has another end connected to the intake manifold 141 disposed downstream of the intake throttle valve 21 in the intake passage 14. Moreover, the opening degree of the EGR valve 172 is controlled by the valve opening degree instruction part 34 of the control device 3, thereby controlling the flow rate of the EGR gas flowing through the EGR pipe 171A.

In the forced regeneration process, the EGR valve 172 is closed to prevent the EGR gas from returning upstream of the cylinder 111, resulting in the total amount of the exhaust gas discharged from the cylinder 111 flowing to the exhaust gas purification device 5. By contrast, in the normal operation, the EGR valve 172 is opened to flow the EGR gas upstream of the cylinder 111, resulting in the part of the exhaust gas discharged from the cylinder 111 becoming the EGR gas and the remaining exhaust gas flowing to the exhaust gas purification device 5. In order to grasp actual situations of the intake flow rate of the combustion gas and the exhaust flow rate of the exhaust gas, if the above-described EGR device 17 is included in the normal operation ("Yes" in S106), a flow rate EF of the EGR gas flowing through the EGR passage 171 is obtained (S109), as shown in FIG. 3.

In some embodiments, the above-described flow rate estimation part 39 is configured to estimate the flow rate EF of the EGR gas flowing through the EGR passage 171 from the second state amount S2 and the opening degree OE of the EGR valve 172 described above, based on a third relationship R3 representing a relationship between the EGR gas flow rate EF, and the second state amount S2 and the opening degree OE of the EGR valve 172, in the normal operation.

The "third relationship R3" indicates a correspondence relationship between the EGR gas flow rate EF, and the second state amount S2 and the opening degree OE of the EGR valve 172, and it is only necessary that when the second state amount S2 and the opening degree OE of the EGR valve 172 are input, the EGR gas flow rate EF corresponding to the input second state amount S2 and opening degree OE of the EGR valve 172 can be specified and obtained. The third relationship R3 includes estimated equations such as a third map 323 to be described later, a figure or a table, a database, and an approximate curve created in advance by conducting an experiment and the like.

In the illustrated embodiment, as shown in FIG. 4, the third map 323 (third relationship R3), which includes the second state amount S2 including the engine rotation speed and the fuel injection amount, and the opening degree OE of the EGR valve 172 as input values, and the EGR gas flow rate EF as an output value, is prestored in the storage part 32 (see FIG. 2). With the third map 323, the flow rate estimation part 39 obtains an estimated value of the EGR gas flow rate EF from the second state amount S2 and the opening degree OE of the EGR valve 172.

With the above configuration, it is possible to accurately estimate the flow rate EF of the EGR gas flowing through the EGR passage 171 from the second state amount S2 and the opening degree OE of the EGR valve 172 based on the third relationship R3, that is, the relationship between the flow rate EF of the EGR gas flowing through the EGR passage 171, and the second state amount S2 and the opening degree OE of the EGR valve 172. Thus, the control device 3 can perform control in consideration of the flow rate EF of the EGR gas flowing through the EGR passage 171.

As shown in FIG. 3, after the intake flow rate I1 in forced regeneration is estimated (S102), based on the estimated first intake flow rate I1, a computation part 41 obtains other state amounts (S103), and control according to the first intake flow rate I1 and the other state amounts is performed on the engine 1 (S104).

Moreover, as shown in FIG. 3, after the intake flow rate I2 in the normal operation is estimated (S105) in the engine 1 without the EGR device 17 ("No" in S106), based on the estimated second intake flow rate I2, the computation part 41 obtains other state amounts (S107), and control according to the second intake flow rate I2 and the other state amounts is performed on the engine 1 (S108).

Moreover, as shown in FIG. 3, after the EGR gas flow rate EF is obtained (S109) in the engine 1 with including the EGR device 17 ("Yes" in S106), based on the estimated second intake flow rate I2 and the EGR gas flow rate EF, the computation part 41 obtains other state amounts (S110), and control according to the second intake flow rate I2, the EGR gas flow rate EF, and the other state amounts is performed on the engine 1 (S111).

The computation part 41 may be included in at least one of the normal operation execution part 35, the forced regeneration process execution part 36, and the flow rate estimation part 39, or may be included separately from the normal operation execution part 35 and the like in the control device 3. Moreover, the other state amounts include, for example, a first exhaust flow rate E1 which is an exhaust flow rate E of the exhaust gas discharged from the cylinder 111 in the forced regeneration, a second exhaust flow rate E2 which is the exhaust flow rate E of the exhaust gas discharged from the cylinder 111 in the normal operation, a third exhaust flow rate E3 which is the exhaust flow rate of the exhaust gas sent to the exhaust gas purification device 5, and an air excess ratio in each of the forced regeneration and the normal operation, as shown in FIG. 4.

The first exhaust flow rate E1 corresponds to the first intake flow rate I1 and can be estimated based on the first intake flow rate I1. Moreover, the second exhaust flow rate E2 corresponds to the second intake flow rate I2 and can be estimated based on the second intake flow rate I2.

In some embodiments, the first intake flow rate I1 in an intake stroke is regarded as the first exhaust flow rate E1 after a predetermined period of time (after the course of a stroke taken until an exhaust stroke) is regarded as the first exhaust flow rate E1, and the second intake flow rate I2 in the intake stroke is regarded as the second exhaust flow rate E2 after the predetermined period of time (after the course of the stroke taken until the exhaust stroke). In some other embodiments, an addition of a fuel injection amount during the above-described predetermined period of time to the first intake flow rate I1 may be regarded as the first exhaust flow rate E1 after the predetermined period of time, and an addition of the fuel injection amount during the above-described predetermined period of time to the second intake flow rate I2 may be regarded as the second exhaust flow rate E2 after the predetermined period of time.

Moreover, in some embodiments, an air-fuel ratio in the forced regeneration process is calculated by dividing the first intake flow rate I1 by the fuel injection amount, and the first exhaust flow rate E1 is calculated based on the first intake flow rate I1 and the air-fuel ratio in the forced regeneration process. Likewise, an air-fuel ratio in the normal operation is calculated by dividing the second intake flow rate I2 by the fuel injection amount, and the second exhaust flow rate E2 is calculated based on the second intake flow rate I2 and the air-fuel ratio in the normal operation. The air excess ratio can be calculated by dividing the air-fuel ratio calculated above by a stoichiometric air-fuel ratio.

The control device 3 can effectively control the forced regeneration process and the engine 1 by controlling the above-described temperature increase unit 6 based on at least one of the first intake flow rate I1, the second intake flow rate I2, the EGR gas flow rate EF, the first exhaust flow rate E1, the second exhaust flow rate E2, the first state amount S1, the second state amount S2, the first opening degree O1, the opening degree OE of the EGR valve, the volumetric efficiency, the air-fuel ratio, the air excess ratio or the like.

If an actual intake flow rate is higher than the estimated first intake flow rate I1, a temperature and pressure of the exhaust passage 15 excessively increase in the forced regeneration process, which may cause a failure in the engine body 11, and destruction in and damage to the oxidation catalyst of the DOC 51 by heat. Moreover, if the actual intake flow rate is lower than the estimated first intake flow rate I1, the PM deposited on the DPF 52 may remain without having completely been combusted. That is, if an error between the estimated first intake flow rate I1 and the actual intake flow rate is large, the forced regeneration process and the control of the engine 1 may not effectively be performed.

Figure 8:
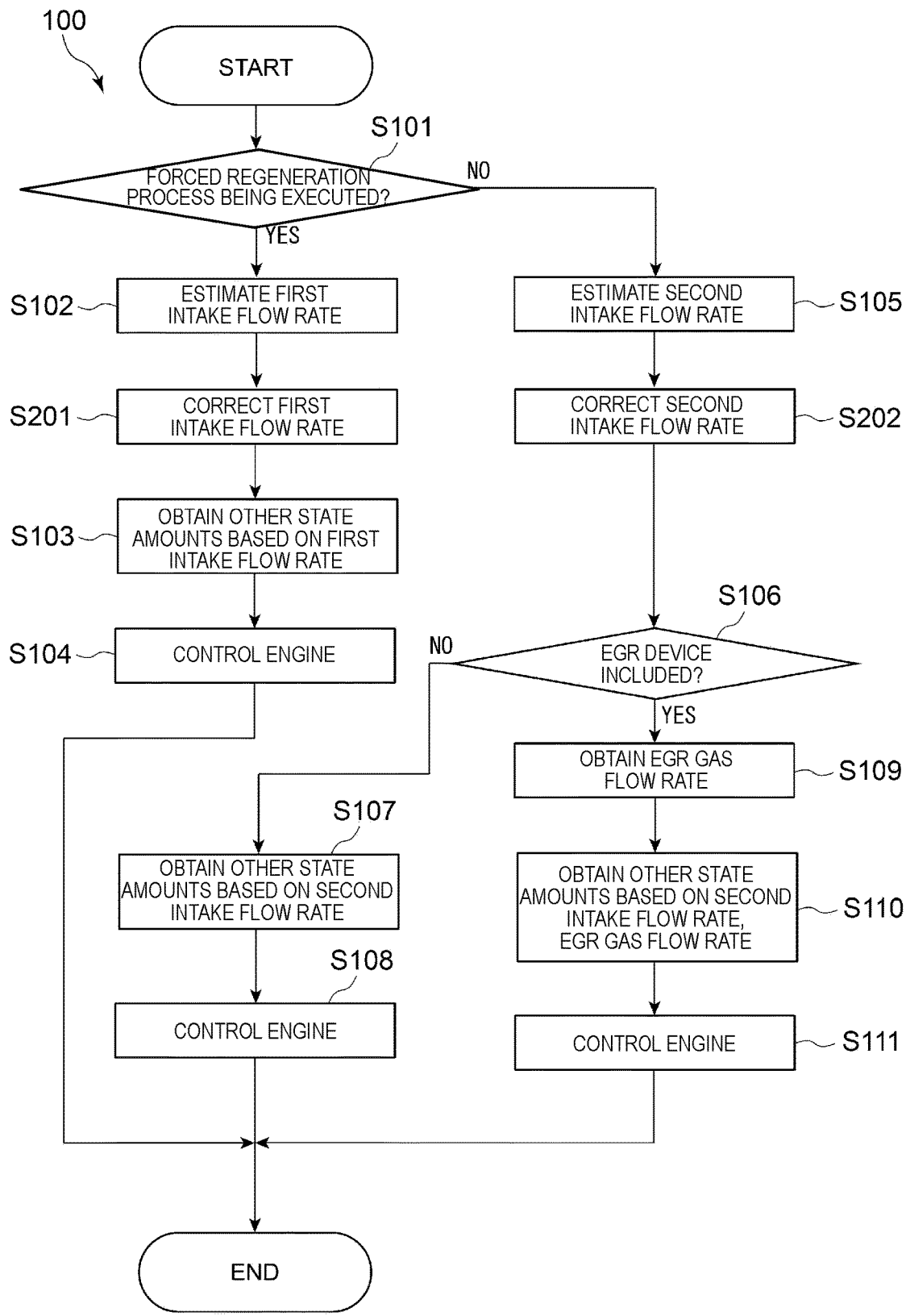
FIG. 8 is a flowchart for describing a control logic of the control device according to another embodiment of the present invention.
Figure 9:
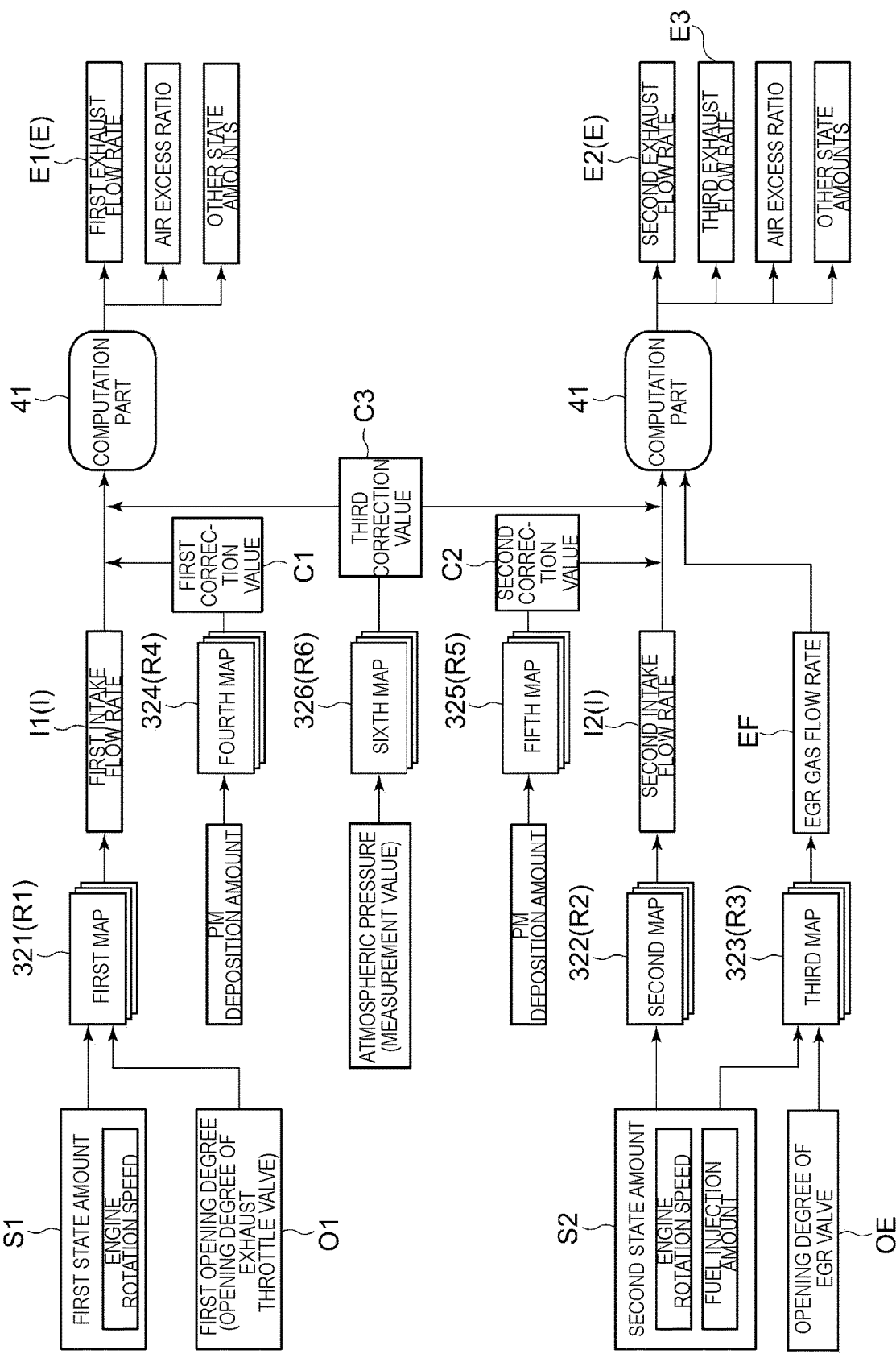
FIG. 9 is a data flow diagram for describing the control device according to another embodiment of the present invention.

FIG. 8 is a flowchart for describing a control logic of the control device according to another embodiment of the present invention. FIG. 9 is a data flow diagram for describing the control device according to another embodiment of the present invention.

In some embodiments, as shown in FIG. 8, after the above-described first intake flow rate I1 is estimated (S102) and before the other state amounts are obtained based on the above-described first intake flow rate I1 (S103), the first intake flow rate I1 is corrected (S201). Moreover, as shown in FIG. 8, after the above-described second intake flow rate I2 is estimated (S105) and before the other state amounts are obtained based solely on the above-described second intake flow rate I2 or based on the above-described second intake flow rate I2 and the EGR gas flow rate EF (S107, S110), the second intake flow rate I2 is corrected (S202).

The correction of the first intake flow rate I1 and the correction of the second intake flow rate I2 will be described below.

In some embodiments, as shown in FIG. 2, the above-described control device 3 further includes a flow rate correction part 40 configured to correct the intake flow rate I estimated by the above-described flow rate estimation part 39. Then, the flow rate correction part 40 includes a first intake flow rate correction part 40A.

As shown in FIG. 9, the first intake flow rate correction part 40A is configured to decrease the first intake flow rate I1, which is estimated by the flow rate estimation part 39, in accordance with a first correction value C1, which is a correction value of the first intake flow rate I1 and is estimated from the PM deposition amount on the DPF 52 estimated by the PM deposition amount estimation part 38, based on a fourth relationship R4 representing a relationship between the first correction value C1 and the PM deposition amount on the DPF 52 estimated by the above-described PM deposition amount estimation part 38. The first correction value C1 may be constituted by a difference amount such that the first correction value C1 is subtracted from the first intake flow rate I1, or may be constituted by a ratio or a rate such that the first correction value C1 is multiplied by the first intake flow rate I1.

The "fourth relationship R4" indicates a correspondence relationship between the first correction value C1 and the PM deposition amount on the DPF 52, and it is only necessary that when the PM deposition amount on the DPF 52 is input, the first correction value C1 corresponding to the input PM deposition amount can be specified and obtained. The fourth relationship R4 includes estimated equations such as a fourth map 324 to be described later, a figure or a table, a database, and an approximate curve created in advance by conducting an experiment and the like.

In the illustrated embodiment, as shown in FIG. 9, the fourth map 324 (fourth relationship R4), which includes the PM deposition amount on the DPF 52 as an input value, and the first correction value C1 as an output value, is prestored in the storage part 32 (see FIG. 2). With the fourth map 324, the flow rate estimation part 39 obtains the first correction value C1 from the PM deposition amount (estimated value) on the DPF 52 and corrects the first intake flow rate I1 by the first correction value C1.

With the above configuration, the first intake flow rate correction part 40A is configured to decrease the first intake flow rate I1 estimated by the flow rate estimation part 39, in accordance with the first correction value C1 which is estimated from the PM deposition amount estimated by the PM deposition amount estimation part 38. If the PM deposition amount on the DPF 52 increases, the back pressure of the engine body 11 (engine 1) is increased and exhaust efficiency is decreased, inevitably decreasing intake efficiency and volumetric efficiency. The corrected first intake flow rate I1, which is obtained by decreasing the first intake flow rate I1 estimated by the flow rate estimation part 39 in accordance with the first correction value C1, is increased in accuracy by reflecting the decrease in volumetric efficiency caused by the PM deposition amount on the DPF 52 thereon. Thus, with the above configuration, it is possible to improve estimation accuracy of the first intake flow rate I1.

In some embodiments, as shown in FIG. 2, the above-described control device 3 includes the above-described flow rate correction part 40. Then, the flow rate correction part 40 includes a second intake flow rate correction part 40B.

As shown in FIG. 9, the second intake flow rate correction part 40B is configured to decrease the second intake flow rate I2, which is estimated by the flow rate estimation part 39, in accordance with a second correction value C2, which is a correction value of the second intake flow rate I2 and is estimated from the PM deposition amount on the DPF 52 estimated by the PM deposition amount estimation part 38, based on a fifth relationship R5 representing a relationship between the second correction value C2 and the PM deposition amount on the DPF 52 estimated by the above-described PM deposition amount estimation part 38. The second correction value C2 may be constituted by a difference amount such that the second correction value C2 is subtracted from the second intake flow rate I2, or may be constituted by a ratio or a rate such that the second correction value C2 is multiplied by the second intake flow rate I2.

The "fifth relationship R5" indicates a correspondence relationship between the second correction value C2 and the PM deposition amount on the DPF 52, and it is only necessary that when the PM deposition amount on the DPF 52 is input, the second correction value C2 corresponding to the input PM deposition amount can be specified and obtained. The fifth relationship R5 includes estimated equations such as a fifth map 325 to be described later, a figure or a table, a database, and an approximate curve created in advance by conducting an experiment and the like.

In the illustrated embodiment, as shown in FIG. 9, the fifth map 325 (fifth relationship R5), which includes the PM deposition amount on the DPF 52 as an input value, and the second correction value C2 as an output value, is prestored in the storage part 32 (see FIG. 2). With the fifth map 325, the flow rate estimation part 39 obtains the second correction value C2 from the PM deposition amount (estimated value) on the DPF 52 and corrects the second intake flow rate I2 by the second correction value C2.

With the above configuration, the second intake flow rate correction part 40B is configured to decrease the second intake flow rate I2 estimated by the flow rate estimation part 39, in accordance with the second correction value C2 which is estimated from the PM deposition amount estimated by the PM deposition amount estimation part 38. If the PM deposition amount on the DPF 52 increases, the back pressure of the engine body 11 (engine 1) is increased and exhaust efficiency is decreased, inevitably decreasing intake efficiency and volumetric efficiency. The corrected second intake flow rate I2, which is obtained by decreasing the second intake flow rate I2 estimated by the flow rate estimation part 39 in accordance with the second correction value C2, is increased in accuracy by reflecting the decrease in volumetric efficiency caused by the PM deposition amount on the DPF 52 thereon. Thus, with the above configuration, it is possible to improve estimation accuracy of the second intake flow rate I2.

In some embodiments, as shown in FIG. 1, the engine 1 further includes an atmospheric pressure acquisition device configured to acquire an atmospheric pressure value. The atmospheric pressure acquisition device includes an atmospheric pressure sensor 92 for measuring the atmospheric pressure. The atmospheric pressure sensor 92 is connected to the control device 3 and is configured to transmit the above-described atmospheric pressure value to the control device 3. As shown in FIG. 2, the above-described flow rate correction part 40 includes a third intake flow rate correction part 40C.

As shown in FIG. 9, the third intake flow rate correction part 40C is configured to increase/decrease the intake flow rate I, which is estimated by the flow rate estimation part 39, in accordance with a third correction value C3, which is a correction value of the intake flow rate I (including the first intake flow rate I1, the second intake flow rate I2) and is estimated from the atmospheric pressure value acquired by the atmospheric pressure sensor 92 (atmospheric pressure acquisition device), based on a sixth relationship R6 representing a relationship between the third correction value C3 and the atmospheric pressure value acquired by the above-described atmospheric pressure sensor 92. The third correction value C3 may be constituted by a difference amount such that the third correction value C3 is added to the intake flow rate I if the atmospheric pressure is higher than a reference pressure such as a standard pressure, and the third correction value C3 is subtracted from the intake flow rate I if the atmospheric pressure is lower than the above-described reference pressure. Alternatively, the third correction value C3 may be constituted by a ratio or a rate such that the third correction value C3 is multiplied by the intake flow rate I.

The "sixth relationship R6" indicates a correspondence relationship between the third correction value C3 and the atmospheric pressure value, and it is only necessary that when the atmospheric pressure value is input, the third correction value C3 corresponding to the input atmospheric pressure value can be specified and obtained. The sixth relationship R6 includes estimated equations such as a sixth map 326 to be described later, a figure or a table, a database, and an approximate curve created in advance by conducting an experiment and the like.

In the illustrated embodiment, as shown in FIG. 9, the sixth map 326 (sixth relationship R6), which includes the atmospheric pressure value as an input value, and the third correction value C3 as an output value, is prestored in the storage part 32 (see FIG. 2). With the sixth map 326, the flow rate estimation part 39 obtains the third correction value C3 from the atmospheric pressure value (measurement value) and corrects the intake flow rate I by the third correction value C3. The sixth map 326 may be constituted by a plurality of maps, and may include maps corresponding to the first intake flow rate I1 and the second intake flow rate I2, respectively.

With the above configuration, the third intake flow rate correction part 40C is configured to increase/decrease the intake flow rate I estimated by the flow rate estimation part 39, in accordance with the third correction value C3 estimated from the atmospheric pressure value (measurement value). An oxygen density of the combustion gas is in a proportional relationship with the atmospheric pressure, and if atmospheric pressure decreases, the amount of oxygen sent to the combustion chamber at once is decreased, inevitably decreasing intake efficiency. Conversely, if the atmospheric pressure increases, intake efficiency improves. The corrected intake flow rate I, which is obtained by increasing/decreasing the intake flow rate I (first intake flow rate I1, second intake flow rate I2) estimated by the flow rate estimation part 39 in accordance with the third correction value C3, is increased in accuracy by reflecting an atmospheric pressure variation thereon. Thus, with the above configuration, it is possible to improve estimation accuracy of the intake flow rate I.

In some embodiments, as shown in FIG. 2, the above-described flow rate correction part 40 may include a plurality of flow rate correction parts of the first intake flow rate correction part 40A, the second intake flow rate correction part 40B, and the third intake flow rate correction part 40C. Moreover, as shown in FIG. 9, using the first intake flow rate I1 or the second intake flow rate I2 corrected by the flow rate correction part 40, the computation part 41 may obtain the other state amounts such as the first exhaust flow rate E1.

Figure 10:
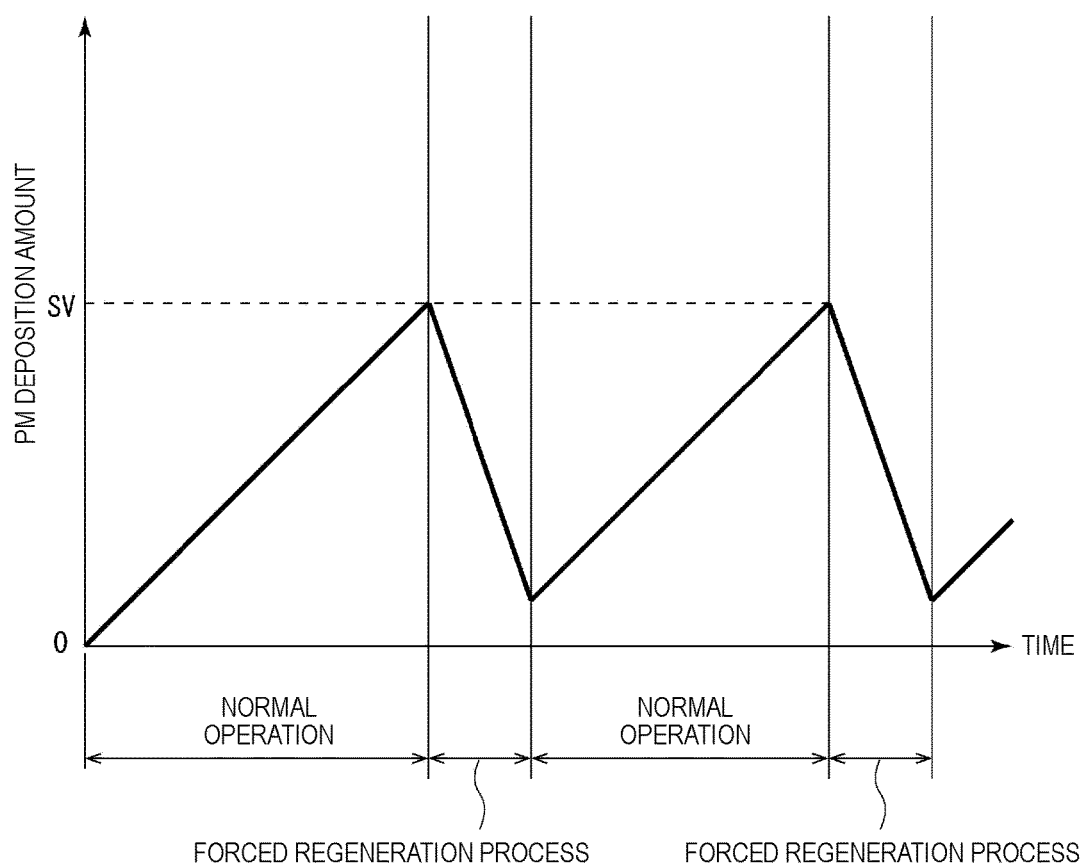
FIG. 10 is a graph for describing an increase/decrease in PM deposition amount in the normal operation and in the forced regeneration process.
Figure 11:
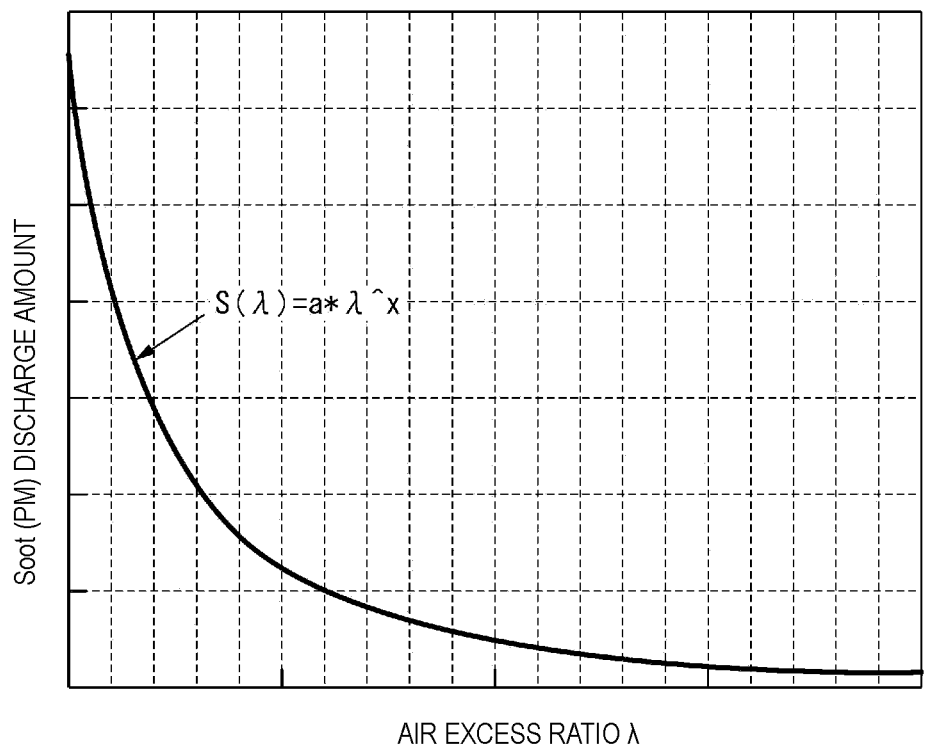
FIG. 11 is a graph for describing a relationship between an air excess ratio and a discharge amount of Soot (PM) discharged from the engine.

FIG. 10 is a graph for describing an increase/decrease in PM deposition amount in the normal operation and in the forced regeneration process. FIG. 11 is a graph for describing a relationship between an air excess ratio and a discharge amount of Soot (PM) discharged from the engine.

As shown in FIG. 10, in the normal operation, while a part of the PM deposited on the DPF 52 is combusted by the high-temperature exhaust gas discharged from the combustion chamber 12 (continuous regeneration), the remaining PM is deposited on the DPF 52, resulting in the PM deposition amount on the DPF 52 gradually increasing with time. As shown in FIG. 11, the air excess ratio and the Soot (PM) discharge amount from the cylinder 111 have a correspondence relationship as indicated by a curve in FIG. 11. Moreover, it is possible to calculate the air excess ratio in the normal operation from the second intake flow rate I2. Moreover, performance of the oxidation catalyst of the DOC 51 depends on the exhaust flow rate E and the intake flow rate I. In view of the above, it is possible to estimate the PM deposition amount in the normal operation based on the second intake flow rate I2.

In the embodiment shown in FIG. 10, the forced regeneration process is executed, if the PM deposition amount on the DPF 52 exceeds a reference value SV. A PM combustion speed in the forced regeneration process depends on the exhaust flow rate E and the intake flow rate I. Thus, it is possible to estimate the PM deposition amount in the forced regeneration process based on the first intake flow rate I1. As shown in FIG. 2, the PM deposition amount estimation part 38 is connected to the flow rate estimation part 39, and is configured to obtain the first intake flow rate I1 and the second intake flow rate I2 from the flow rate estimation part 39.

In some embodiments, the above-described PM deposition amount estimation part 38 is configured to estimate the PM deposition amount according to the first intake flow rate I1 in the forced regeneration process, and is configured to estimate the PM deposition amount according to the second intake flow rate I2 which is different from the first intake flow rate I1 in the normal operation. In this case, the PM deposition amount estimation part 38 estimates the PM deposition amount according to the first intake flow rate I1 in the forced regeneration process, and estimates the PM deposition amount according to the second intake flow rate I2 which is different from the first intake flow rate I1 in the normal operation. That is, the estimation method for the intake flow rate I is different between the forced regeneration process and the normal operation, and the intake flow rate I used to estimate the PM deposition amount is also different between the forced regeneration process and the normal operation. Using the estimation methods for the intake flow rates I suitable for the forced regeneration process and the normal operation, respectively, it is possible to improve estimation accuracy of the first intake flow rate I1 in the forced regeneration process and the second intake flow rate I2 in the normal operation, and to improve estimation accuracy of the PM deposition amount estimated by the first intake flow rate I1 and the second intake flow rate I2.

In some embodiments, the above-described PM deposition amount estimation part 38 is configured to estimate the PM deposition amount according to the first exhaust flow rate E1, which is the exhaust flow rate E of the exhaust gas discharged from the cylinder 111 in the forced regeneration process and corresponds to the first intake flow rate I1, in the forced regeneration process. Then, the PM deposition amount estimation part 38 is configured to estimate the PM deposition amount according to the exhaust flow rate (third exhaust flow rate E3) removing the flow rate EF of the EGR gas flowing through the EGR passage 171 from the second exhaust flow rate E2, which is the exhaust flow rate E of the exhaust gas discharged from the cylinder 111 in the normal operation and corresponds to the second intake flow rate I2, in the normal operation. The third exhaust flow rate E3 is the flow rate of the exhaust gas flowing to the exhaust gas purification device 5 in the normal operation. Moreover, the first exhaust flow rate E1 after a predetermined period of time can be regarded as the flow rate of the exhaust gas flowing to the exhaust gas purification device 5 in the forced regeneration process.

With the above configuration, the PM deposition amount estimation part 38 estimates the PM deposition amount according to the first exhaust flow rate E1 corresponding to the first intake flow rate I1 in the forced regeneration process, and estimates the PM deposition amount according to the exhaust flow rate (third exhaust flow rate E3) removing the flow rate EF of the EGR gas flowing through the EGR passage 171 from the second exhaust flow rate E2 corresponding to the second intake flow rate I2 in the normal operation. That is, between the forced regeneration process and the normal operation, the exhaust flow rate E used to estimate the PM deposition amount is different. Estimating the PM deposition amount by the exhaust flow rates E suitable for the forced regeneration process and the normal operation, respectively, it is possible to improve estimation accuracy of the estimated PM deposition amount. In particular, in the normal operation, removing the flow rate EF of the EGR gas flowing to the EGR passage 171 from the second exhaust flow rate E2, estimation accuracy of the estimated PM deposition amount is to be improved.

In some embodiments, the computation part 41 of the control device 3 may execute a filtering process on the first intake flow rate I1 and the second intake flow rate I2 so that a temporal change in estimated value becomes slow. In this case, it is possible to remove noise and things of low importance from the estimated value, and thus it is possible to improve estimation accuracy of the first intake flow rate I1 and the second intake flow rate I2, as a result.

In some embodiments described above, as shown in FIG. 1, the engine 1 includes the above-described control device 3, the above-described DOC 51, the above-described DPF 52, and the above-described temperature increase unit 6 including the above-described exhaust throttle valve 22. In this case, with the control device 3, the engine 1 can accurately estimate the first intake flow rate I1 which is the intake flow rate I in the forced regeneration process and the second intake flow rate I2 which is the intake flow rate I in the normal operation where the forced regeneration process is not executed. Thus, with the above configuration, the engine 1 can accurately estimate the intake flow rate I of the combustion gas sent into the cylinder 111 of the engine 1, without using the air flow sensor.

In some embodiments described above, the case in which the engine 1 is the naturally aspirated engine (NA engine) has been described. However, the present invention is also applicable to an engine including a supercharger such as a turbocharger or a supercharger. In this case, including the supercharger, estimation accuracy of the first intake flow rate I1 and the second intake flow rate I2 may be decreased. Thus, in order to improve estimation accuracy of the first intake flow rate I1 and the second intake flow rate I2, the first intake flow rate I1 and the second intake flow rate I2 may be estimated further based on the temperature and the pressure at the inlet side of the cylinder 111 in the intake passage 14, and the temperature and the pressure at the outlet side of the cylinder 111 in the exhaust passage 15.

An engine control method 100 according to some embodiments is a method for executing the forced regeneration process of removing the PM deposited on the DPF 52 by increasing the temperature of the DPF 52 in the engine 1 which includes the above-described DOC 51, the above-described DPF 52, and the above-described temperature increase unit 6 including the above-described exhaust throttle valve 22. Then, as shown in FIG. 3, 8, the engine control method 100 includes an intake flow rate estimation step of estimating the intake flow rate I of the combustion gas sent into the cylinder 111 of the engine 1. Then, as shown in FIG. 3, 8, the intake flow rate estimation step includes the first intake flow rate estimation step S102 of estimating the first intake flow rate I1 described above. In the illustrated embodiment, as shown in FIG. 3, 8, the intake flow rate estimation step further includes the second intake flow rate estimation step S105 of estimating the second intake flow rate I2 described above.

With the above method, in the first intake flow rate estimation step S102, it is possible to accurately estimate the corresponding first intake flow rate I1 from the first state amount S1 and the first opening degree O1 based on the first relationship R1, that is, the relationship between the first intake flow rate I1, and the first state amount S1 and the first opening degree O1. In the forced regeneration process, the control device 3 performs control of reducing (decreasing) the opening degree of the exhaust throttle valve 22. Using the first opening degree O1, that is, the opening degree of the exhaust throttle valve 22 in the forced regeneration process to estimate the first intake flow rate I1, it is possible to estimate the first intake flow rate I1 considering the decrease in volumetric efficiency which is caused by reducing the opening degree of the exhaust throttle valve 22. Thus, with the above configuration, it is possible to accurately estimate the intake flow rate I of the combustion gas sent into the cylinder 111 of the engine 1, without using the air flow sensor.

The present invention is not limited to the above-described embodiments, and also includes an embodiment obtained by modifying the above-described embodiments and an embodiment obtained by combining these embodiments as appropriate.

REFERENCE SIGNS LIST

1 Engine
11 Engine body
111 Cylinder
112 Piston
12 Combustion chamber
13 Fuel injection valve
14 Intake passage
15 Exhaust passage
16 Exhaust passage injection valve
17 EGR device
2 Throttle valve
21 Intake throttle valve
22 Exhaust throttle valve
3 Control device
31 Input/output part
32 Storage part
33 Injection control part
34 Valve opening degree instruction part
35 Normal operation execution part
36 Forced regeneration process execution part
37 Forced regeneration process execution condition determination part
38 PM deposition amount estimation part
39 Flow rate estimation part
40 Flow rate correction part
41 Computation part
5 Exhaust gas purification device
51 DOC
52 DPF
6 Temperature increase unit
91 Engine rotation speed sensor
92 Atmospheric pressure sensor
E Exhaust flow rate
E1 First exhaust flow rate
E2 Second exhaust flow rate
E3 Third exhaust flow rate
EF EGR gas flow rate
I Intake flow rate
I1 First intake flow rate
I2 Second intake flow rate
O1 First opening degree
OE Opening degree of EGR valve
S1 First state amount
S2 Second state amount

The invention claimed is:

1. A control device including a processor and configured to be able to execute, in an engine which includes a DOC disposed in an exhaust passage of the engine, a DPF disposed downstream of the DOC in the exhaust passage, and a temperature increase unit for increasing a temperature of each of the DOC and the DPF, a forced regeneration process of removing PM deposited on the DPF by increasing the temperature of the DPF, wherein the temperature increase unit includes an exhaust throttle valve disposed in the exhaust passage, wherein the control device comprises:

programming to control adjusting an intake flow rate of a combustion gas sent into a cylinder of the engine, and a flow rate estimation part configured to estimate the intake flow rate of the combustion gas sent into the cylinder of the engine, wherein the flow rate estimation part is:

configured to estimate a first intake flow rate, which is the intake flow rate in the forced regeneration process, from an opening degree of the exhaust throttle valve and a first state amount which indicates an operation state of the engine including a rotation speed of the engine, based on a first relationship representing a relationship between the first intake flow rate, and the opening degree of the exhaust throttle valve and the first state amount, in the forced regeneration process, wherein the flow rate estimation part is:

configured to estimate a second intake flow rate, which is the intake flow rate in a normal operation where the forced regeneration process is not executed, from a second state amount which indicates an operation state of the engine including the rotation speed of the engine and a fuel injection amount, based on a second relationship representing a relationship between the second state amount and the second intake flow rate, in the normal operation, wherein the engine further includes:

an EGR passage for connecting an intake passage and the exhaust passage of the engine, and for returning a part of an exhaust gas, which is discharged from the engine, to the intake passage as an EGR gas; and an EGR valve configured to be able to adjust a flow rate of the EGR gas flowing through the EGR passage, and wherein the flow rate estimation part is:

configured to estimate the flow rate of the EGR gas from the second state amount and an opening degree of the EGR valve, based on a third relationship representing a relationship between the flow rate of the EGR gas flowing through the EGR passage, and the second state amount and the opening degree of the EGR valve.

2. An engine, comprising:
the control device according to claim 1;
the DOC;
the DPF; and
the temperature increase unit including the exhaust throttle valve.

3. A control device including a processor and configured to be able to execute, in an engine which includes a DOC disposed in an exhaust passage of the engine, a DPF disposed downstream of the DOC in the exhaust passage, and a temperature increase unit for increasing a temperature of each of the DOC and the DPF, a forced regeneration process of removing PM deposited on the DPF by increasing the temperature of the DPF, wherein the temperature increase unit includes an exhaust throttle valve disposed in the exhaust passage, wherein the control device comprises:

a flow rate estimation part configured to estimate an intake flow rate of a combustion gas sent into a cylinder of the engine, wherein the flow rate estimation part is:

configured to estimate a first intake flow rate, which is the intake flow rate in the forced regeneration process, from an opening degree of the exhaust throttle valve and a first state amount which indicates an operation state of the engine including a rotation speed of the engine, based on a first relationship representing a relationship between the first intake flow rate, and the opening degree of the exhaust throttle valve and the first state amount, in the forced regeneration process, wherein the flow rate estimation part is:

configured to estimate a second intake flow rate, which is the intake flow rate in a normal operation where the forced regeneration process is not executed, from a second state amount which indicates an operation state of the engine including the rotation speed of the engine and a fuel injection amount, based on a second relationship representing a relationship between the second state amount and the second intake flow rate, in the normal operation, a PM deposition amount estimation part configured to be able to estimate a deposition amount of the PM deposited on the DPF; and a first intake flow rate correction part configured to decrease the first intake flow rate, which is estimated by the flow rate estimation part, in accordance with a first correction value, which is a correction value of the first intake flow rate and is estimated from the PM deposition amount estimated by the PM deposition amount estimation part, based on a fourth relationship representing a relationship between the first correction value and the PM deposition amount estimated by the PM deposition amount estimation part.

4. The control device according to claim 3,
wherein the PM deposition amount estimation part is:
configured to estimate the PM deposition amount according to the first intake flow rate, in the forced regeneration process; and
configured to estimate the PM deposition amount according to the second intake flow rate which is different from the first intake flow rate, in the normal operation.

5. The control device according to claim 4,
wherein the engine further includes:
an EGR passage for connecting an intake passage and the exhaust passage of the engine, and for returning a part of an exhaust gas, which is discharged from the engine, to the intake passage as an EGR gas; and
an EGR valve configured to be able to adjust a flow rate of the EGR gas flowing through the EGR passage, and
wherein the flow rate estimation part is:
configured to estimate the flow rate of the EGR gas from the second state amount and an opening degree of the EGR valve, based on a third relationship representing a relationship between the flow rate of the EGR gas flowing through the EGR passage, and the second state amount and the opening degree of the EGR valve, and
wherein the PM deposition amount estimation part is:
configured to estimate the PM deposition amount according to a first exhaust flow rate, which is an exhaust flow rate of an exhaust gas discharged from the cylinder in the forced regeneration process and corresponds to the first intake flow rate, in the forced regeneration process; and
configured to estimate the PM deposition amount according to an exhaust flow rate removing the flow rate of the EGR gas flowing through the EGR passage from a second exhaust flow rate, which is an exhaust flow rate of the exhaust gas discharged from the cylinder in the normal operation and corresponds to the second intake flow rate, in the normal operation.

6. An engine, comprising:
the control device according to claim 3;
the DOC;
the DPF; and
the temperature increase unit including the exhaust throttle valve.

7. A control device including a processor and configured to be able to execute, in an engine which includes a DOC disposed in an exhaust passage of the engine, a DPF disposed downstream of the DOC in the exhaust passage, and a temperature increase unit for increasing a temperature of each of the DOC and the DPF, a forced regeneration process of removing PM deposited on the DPF by increasing the temperature of the DPF, wherein the temperature increase unit includes an exhaust throttle valve disposed in the exhaust passage,
wherein the control device comprises:
a flow rate estimation part configured to estimate an intake flow rate of a combustion gas sent into a cylinder of the engine,
wherein the flow rate estimation part is:
configured to estimate a first intake flow rat e, which is the intake flow rate in the forced regeneration process, from an opening degree of the exhaust throttle valve and a first state amount which indicates an operation state of the engine including a rotation speed of the engine, based on a first relationship representing a relationship between the first intake flow rate, and the opening degree of the exhaust throttle valve and the first state amount, in the forced regeneration process,
wherein the flow rate estimation part is:
configured to estimate a second intake flow rate, which is the intake flow rate in a normal operation where the forced regeneration process is not executed, from a second state amount which indicates an operation state of the engine including the rotation speed of the engine and a fuel injection amount, based on a second relationship representing a relationship between the second state amount and the second intake flow rate, in the normal operation,
a PM deposition amount estimation part configured to be able to estimate a deposition amount of the PM deposited on the DPF; and
a second intake flow rate correction part configured to decrease the second intake flow rate, which is estimated by the flow rate estimation part, in accordance with a second correction value, which is a correction value of the second intake flow rate and is estimated from the PM deposition amount estimated by the PM deposition amount estimation part, based on a fifth relationship representing a relationship between the second correction value and the PM deposition amount estimated by the PM deposition amount estimation part.

8. The control device according to claim 7,
wherein the PM deposition amount estimation part is:
configured to estimate the PM deposition amount according to the first intake flow rate, in the forced regeneration process; and
configured to estimate the PM deposition amount according to the second intake flow rate which is different from the first intake flow rate, in the normal operation.

9. The control device according to claim 8,
wherein the engine further includes:
an EGR passage for connecting an intake passage and the exhaust passage of the engine, and for returning a part of an exhaust gas, which is discharged fro the engine, to the intake passage as an EGR gas; and
an EGR valve configured to be able to adjust a flow rate of the EGR gas flowing through the EGR passage, and
wherein the flow rate estimation part is:
configured to estimate the flow rate of the EGR gas from the second state amount and an opening degree of the EGR valve, based on a third relationship representing a relationship between the flow rate of the EGR gas flowing th rough the EGR passage, and the second stage amount and the opening degree of the EGR valve, and wherein the PM deposition amount estimation part is:
configured to estimate the PM deposition amount according to a first exhaust flow rate, which is an exhaust flow rate of an exhaust gas discharged from the cylinder in the forced regeneration process and corresponds to the first intake flow rate, in the forced regeneration process; and
configured to estimate the PM deposition amount according to an exhaust flow rate removing the flow rate of the EGR gas flowing through the EGR passage from a second exhaust flow rate, which is an exhaust flow rate of the exhaust gas discharged from the cylinder in the normal operation and corresponds to the second intake flow rate, in the normal operation.

10. An engine, comprising:
the control device according to claim 7;
the DOC;
the DPF; and
the temperature increase unit including the exhaust throttle valve.

11. A control device including a processor and configured to be able to execute, in an engine which includes a DOC disposed in an exhaust passage of the engine, a DPF disposed downstream of the DOC in the exhaust passage, and a temperature increase unit for increasing a temperature of each of the DOC and the DPF, a forced regeneration process of removing PM deposited on the DPF by increasing the temperature of the DPF, wherein the temperature increase unit includes an exhaust throttle valve disposed in the exhaust passage,
wherein the control device comprises:
a flow rate estimation part configured to estimate an intake flow rate of a combustion gas sent into a cylinder of the engine,
wherein the flow rate estimation part is:
configured to estimate a first intake flow rate, which is the intake flow rate in the forced regeneration process, from an opening degree of the exhaust throttle valve and a first state amount which indicates an operation state of the engine including a rotation speed of the engine, based on a first relationship representing a relationship between the first intake flow rate, and the opening degree of the exhaust throttle valve and the first state amount, in the forced regeneration process,
wherein the engine further includes an atmospheric pressure sensor configured to acquire an atmospheric pressure value, and
wherein the control device further comprises:
a third intake flow rate correction part configured to increase/decrease the intake flow rate, which is estimated by the flow rate estimation part, in accordance with a third correction value, which is a correction value of the intake flow rate and is estimated from the atmospheric pressure value acquired by the atmospheric pressure acquisition device, based on a sixth relationship representing a relationship between the third correction value and the atmospheric pressure value acquired by the atmospheric pressure acquisition device.

12. An engine, comprising:
the control device according to claim 11;
the DOC;
the DPF; and the temperature increase unit including the exhaust throttle valve.

* * * * *